US012580781B2

(12) United States Patent
Wang et al.

(10) Patent No.: US 12,580,781 B2
(45) Date of Patent: Mar. 17, 2026

(54) DEVICE MANAGEMENT METHOD, SYSTEM, AND APPARATUS

(71) Applicant: HUAWEI TECHNOLOGIES CO., LTD., Shenzhen (CN)

(72) Inventors: Haiguang Wang, Singapore (SG); Xin Kang, Singapore (SG); Tieyan Li, Singapore (SG); Cheng Kang Chu, Singapore (SG); Zhongding Lei, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 18/416,938

(22) Filed: Jan. 19, 2024

(65) Prior Publication Data

US 2024/0163119 A1     May 16, 2024

Related U.S. Application Data

(63) Continuation of application No. PCT/CN2022/103564, filed on Jul. 4, 2022.

(30) Foreign Application Priority Data

Jul. 22, 2021     (CN) .......................... 202110832257.3

(51) Int. Cl.
$H04L\ 29/06$         (2006.01)
$H04L\ 9/00$         (2022.01)
(Continued)

(52) U.S. Cl.
CPC .................. $H04L\ 9/50$ (2022.05); $H04L\ 9/30$ (2013.01); $H04L\ 9/32$ (2013.01)

(58) Field of Classification Search
CPC ........ G06F 21/44; G06F 21/445; G06F 21/60; G06F 21/62; G06F 21/6209;
(Continued)

(56) References Cited

U.S. PATENT DOCUMENTS 11,388,127 B1 *    7/2022    Tikoian ............... G06F 3/04883
2005/0174988 A1 *    8/2005    Bieber .................... G06F 21/34
711/E12.093
(Continued)

OTHER PUBLICATIONS

Hsiao-Shan Huang et al:"A Secure File Sharing System Based on IPFS and Blockchain." Aug. 25, 2020, total 5 pages.
(Continued)

*Primary Examiner* — Malcolm Cribbs

(57) ABSTRACT

A device management method, system, and apparatus are disclosed. The method includes: A second device sends an identity file to a first access control node, to indicate the first access control node to store the identity file in a file system, where the identity file includes identity information of a first device and a public key of the second device. The second device receives a first identifier sent by the first access control node. The first identifier is used to read the identity file from the file system. After verification is performed on the second device and information about a device associated with the first device in association information and succeeds, the first access control node sends the identity file to the file system. The association information is stored in a database node and a blockchain.

20 Claims, 18 Drawing Sheets

(51) Int. Cl.
    *H04L 9/30*          (2006.01)
    *H04L 9/32*          (2006.01)

(58) Field of Classification Search
    CPC . G06F 21/6218; H04L 63/08; H04L 63/0823;
                H04L 63/0876; H04L 63/10; H04L
            63/102; H04L 63/104; H04L 9/50; H04L
            9/30; H04L 9/32; H04W 12/02; H04W
                    12/40; H04W 12/43; H04W 12/45
    See application file for complete search history.

(56)                    References Cited

U.S. PATENT DOCUMENTS

| | | | |
|---|---|---|---|
| 2012/0203892 A1* | 8/2012 | Pignataro | H04L 67/55 |
| | | | 709/224 |
| 2019/0020648 A1* | 1/2019 | Haque | H04L 63/108 |
| 2019/0104404 A1* | 4/2019 | Tang | H04W 8/24 |
| 2019/0229930 A1* | 7/2019 | Haque | H04L 63/10 |
| 2019/0289454 A1 | 9/2019 | Inoue | |
| 2021/0334303 A1* | 10/2021 | Guo | H04W 4/80 |
| 2021/0334353 A1* | 10/2021 | Peng | H04W 12/069 |

OTHER PUBLICATIONS

LAN/MAN Standards Committee:"IEEE Standard for Local and Metropolitan Area Networks-Secure Device Identity." IEEE Std 802.1AR-2018. total 73 pages.
M. Pritikin et al:"RFC 8995 Bootstrapping Remote Secure Key Infrastructure (BRSKI)." May 2021, total 116 pages.
Extended European Search Report issued in EP22845132.4, dated Sep. 17, 2024, 7 pages.

\* cited by examiner

DEVICE MANAGEMENT METHOD, SYSTEM, AND APPARATUS

CROSS-REFERENCE TO RELATED APPLICATIONS

This application is a continuation of International Application No. PCT/CN2022/103564, filed on Jun. 4, 2022, which claims priority to Chinese Patent Application No. 202110832257.3, filed on Jul. 22, 2021. The disclosures of the aforementioned applications are hereby incorporated by reference in their entireties.

TECHNICAL FIELD

This disclosure relates to the field of artificial intelligence, and in particular, to a device management method, system, and apparatus.

BACKGROUND

As communication networks develop, more devices are connected to the networks. For example, an internet of things (IoT) device is a cornerstone of a digital world and an interface between the digital world and a physical world. The device senses information from the physical world, sends the information to the digital world, receives feedback from the digital world, and performs an action.

Identity management is usually manually performed on devices, including identity issuing, reclamation, transfer, and the like, which has difficulty in coping with challenges brought by identity management of a large quantity of devices. Therefore, how to implement more efficient identity management is currently a major challenge.

SUMMARY

This disclosure provides a device management method, system, and apparatus, to implement automatic management on a device, thereby effectively protecting data privacy and security of the device.

In view of this, according to a first aspect, this disclosure provides a device management system, including a first device, a second device, a first access control node, a file system, a database node, and a blockchain node. A database for storing data is deployed on the database node.

The second device is configured to send an identity file to the first access control node, and the identity file includes identity information of the first device and a public key of the second device.

The first access control node is configured to request association information of the first device from the database node based on the identity file, the association information includes a public key of a device associated with the first device, and the association information is obtained by the database node from the blockchain node.

If the first access control node determines, based on association information, that the first device is associated with the second device, the first access control node is further configured to send the identity file to the file system.

The file system is configured to store the identity file and feed back a first identifier corresponding to the identity file to the first access control node, and the first identifier is used to read the identity file from the file system.

In an example implementation of this disclosure, the database node can obtain the association information of the first device from data stored in the blockchain node. The association information includes information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management system provided in this disclosure, the access control node can be used to perform access control on a device that accesses the system or the second device, verify permission of the device that accesses the system, and allow the device to perform further processing, such as data storage or data reading, only when the device has the permission to access the system, thereby improving privacy and security of data transmission in the system.

In a possible implementation, before the sending an identity file to the first access control node, the second device is further configured to send registration information to the blockchain node, and the registration information includes a public key of the first device and the public key of the second device.

The blockchain node is configured to: after verification on the public key of the second device and succeeds, write the public key of the first device and the public key of the second device into transaction information in a blockchain according to a smart contract corresponding to the first device, for registration of the first device.

The database node is configured to: obtain transaction information of the blockchain node, and store, in the association information, the public key of the first device and the public key of the second device that are included in the transaction information.

Therefore, in this implementation, before storing the identity file of the first device in the file system, the second device further registers the first device in the blockchain node, so that the blockchain node can select a smart contract matching the first device to write information about the first device into the transaction information in the blockchain. Therefore, the database node obtains the transaction information of the blockchain node to generate the association information of the first device. The association information can indicate the device associated with the first device. Therefore, in a subsequent procedure, the access control node can verify ownership of the first device based on the association information stored in the database, thereby improving data security of the first device. In addition, the first device can be automatically registered according to a smart contract of a blockchain, which can be applied to a scenario with a large quantity of devices and has a strong generalization capability.

In a possible scenario, the second device is further configured to send the first identifier to the blockchain node.

The blockchain node is further configured to update the first identifier to locally stored transaction information of the first device according to the smart contract corresponding to the first device.

Therefore, in this implementation, after storing the identity file of the first device in the file system, the second device further stores, in the blockchain node, the first identifier fed back by the file system, so that the blockchain node stores the first identifier in the transaction information of the first device according to the smart contract. Therefore, when obtaining the transaction information again, the database node can update the first identifier to the association information of the first device, so that the association information of the first device includes more complete information of the first device.

In a possible scenario, the second device is further configured to send an identity request message to the first access control node. The identity request message carries the information about the first device and the public key of the second device. The identity request message is used to request the identity file. The information about the first device may include the public key, a name, another identifier, or the like of the first device.

The first access control node is further configured to obtain the first identifier.

The first access control node is further configured to: send the first identifier to the file system, and receive the identity file fed back by the file system.

If a public key included in the identity file matches the public key of the second device, the first access control node is further configured to send the identity file to the second device.

In this implementation, the second device may further request the identity file of the first device from the access control node. The access control node may verify the public key carried in the received identity file and the public key carried in the identity request message. If the public keys match, it indicates that ownership of the device corresponding to the identity file is the second device, and the identity file may be transmitted to the second device. Therefore, in this implementation, the access control node can verify the ownership of the device, thereby ensuring security of the identity file of the device.

In a possible scenario, the first device is further configured to send an identity credential to the first access control node. The identity credential includes an identifier of the first device, to request the identity file from the first access control node. The identifier of the first device may include the name or the public key of the first device, a unique identifier allocated to the first device, or the like.

The first access control node is further configured to: if verification is performed on the identity credential and succeeds, send a second request message to the database node, where the second request message includes the identifier of the first device.

The database node is further configured to feed back the first identifier to the first access control node.

The first access control node is further configured to: send the first identifier to the file system, and receive the identity file fed back by the file system.

If an identifier included in the identity file matches the identifier in the identity credential, the first access control node is further configured to send the identity file to the first device.

In this implementation, the first device may query the access control node for the identity file of the first device. The access control node may perform verification on the identity credential of the first device, and send the identity file to the first device only after verification succeeds, thereby improving data security of the first device.

In a possible implementation, the device management system further includes a registration server.

The first device is specifically configured to send the identity credential to the registration server through an encrypted channel.

The registration server is configured to forward the identity credential to an access control server through an encrypted channel.

The first access control node is specifically configured to send the identity file to the registration server.

The registration server is specifically configured to forward the identity file to the first device.

Therefore, in this implementation, data transmitted between the first device and the first access control node may be transmitted through the encrypted channel between the first device and the registration server, thereby improving security of data transmission between the first device and the first access control node.

In a possible implementation, the device management system further includes a second access control node.

The first device is configured to send a third request message to the second access control node.

The second access control node is configured to obtain a second identifier of the identity file after verification is performed on the third request message and succeeds.

The second access control node is further configured to feed back the second identifier to the first device.

The first device is further configured to: when it is verified that the first identifier matches the second identifier, store the identity file.

In this implementation, a plurality of access control nodes may be disposed in the device management system. After the identity file is obtained by using the first access control node, the second identifier may be further obtained by using the second access control node. Then, it is verified whether the first identifier matches the second identifier. If the first identifier matches the second identifier, it is determined that the identity file is a correct file, and the identity file may be stored, to ensure accuracy of the obtained identity file.

In a possible implementation, the first access control node is specifically configured to: send a first request message to the database node, and receive the first identifier fed back by the database node, where the first request message includes the public key of the first device.

Therefore, in this implementation, the first access control node may obtain the first identifier from the database, to request the identity file of the first device from the file system based on the first identifier, and successfully obtain the identity file.

In a possible implementation, the first identifier may also be sent by the second device to the first access control node, or in a registration process of the first device, the first access control node may store the first identifier, so that when the identity file is queried, the first identifier may be extracted from locally stored data.

In a possible implementation, the device management system further includes a third device.

The second device is further configured to add information about the third device to the identity file, to obtain an updated identity file, where the information about the third device includes a public key of the third device.

The second device is further configured to send the updated identity file to the first access control node.

The first access control node is further configured to: send the updated identity file to the file system, and receive a third identifier fed back by the file system.

The first access control node is further configured to send the third identifier to the second device.

The second device is further configured to send the third identifier to the third device, where the third identifier is used to request the updated identity file from the file system.

The second device is further configured to send update information to the blockchain node, where the update information includes the public key of the first device, the public key of the third device, and the third identifier.

The blockchain node updates the transaction information based on the update information, to obtain updated transaction information.

The database node is further configured to: obtain the updated transaction information, and update the association information based on the updated transaction information, to obtain updated association information.

In this implementation, the second device can transfer the first device to the third device. The second device writes the information about the third device into the identity file of the first device, and sends the identity file to the access control node, to notify the blockchain node that the first device has been transferred, so that the database node obtains transaction information of the blockchain node and updates the association information of the first device. Therefore, in this implementation, the second device can transfer the device by modifying the identity file of the first device, and ownership transfer of the device can be completed without a manual operation.

In a possible implementation, the first identifier is obtained by the file system by performing an operation on the identity file according to a hash algorithm.

According to a second aspect, this disclosure provides a device management method, applied to a device management system. The device management system includes a second device, a first access control node, a file system, a first device, a database node, and a blockchain node. A database for storing data is deployed on the database node. The first device is associated with the second device. The method includes:

The second device sends an identity file to the first access control node, to indicate the first access control node to store the identity file in the file system, where the identity file includes a public key of the first device and a public key of the second device. The second device receives a first identifier sent by the first access control node. The first identifier is used to read the identity file from the file system. The first identifier is generated by the file system after the first access control node sends the identity file to the file system. After verification is performed on the second device and information about a device associated with the first device in association information and succeeds, the first access control node sends the identity file to the file system. The association information is requested and obtained by the first access control node from the blockchain node, and the association information is stored in the database node.

Therefore, in an implementation of this disclosure, the database node can obtain the association information of the first device from data stored in the blockchain node. The association information includes the information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management method provided in this disclosure, the access control node can be used to perform access control on a device that accesses the system or the second device, verify permission of the device that accesses the system, and allow the device to perform further processing, such as data storage or data reading, only when the device has the permission to access the system, thereby improving privacy and security of data transmission in the system.

In a possible implementation, before the second device sends an identity file to the first access control node, the method may further include: The second device sends registration information to the blockchain node. The registration information includes information (such as the public key, a name, another identifier, or the like of the first device) about the first device and the public key of the second device. The registration information indicates the blockchain node to store the information about the first device and the public key of the second device in transaction information of the first device according to a smart contract corresponding to the first device. The transaction information is used by the database node to generate the association information of the first device.

Therefore, in this implementation, before uploading an identity file of a device, the second device may further register the device with the blockchain node, so that the database node has association information of the device. An access control server may verify, based on the association information of the device, whether the second device has permission to upload the identity file, to prevent an unauthorized device from modifying the identity file of the device, and improve data security of the device.

In a possible implementation, the method may further include: The second device sends the first identifier to the blockchain node, to indicate the blockchain node to update the first identifier to the transaction information of the first device.

In this implementation, the first identifier indicating the identity file may be further updated to the association information of the device based on the blockchain, so that the association information of the device includes more complete information.

In a possible implementation, the method may further include: The second device sends the first identifier to the first access control node. The second device receives the identity file sent by the first access control node, where the identity file is requested and obtained by the first access control node from the file system based on the first identifier.

In this implementation, the second device may query the identity file based on the first identifier, so that the second device can query the identity file of the device.

In a possible implementation, the device management system further includes a second access control node. The method may further include: The second device sends a third request message to the second access control node. The second device receives a second identifier sent by the second access control node. If the second identifier matches the first identifier, the second device stores the identity file.

Therefore, in this implementation, the second device may separately request identity files and identifiers corresponding to the identity files from a plurality of access control nodes. When identifiers fed back by the plurality of access control nodes match, it indicates that received identity files are accurate, and the accurate identity files may be stored.

In a possible implementation, the method may further include: The second device receives information about a third device, where the information about the third device includes a public key of the third device. The second device adds the public key of the third device to the identity file, to obtain an updated identity file, where the updated identity file indicates that the first device is associated with the third device. The second device sends the updated identity file to the first access control node, to indicate the first access control node to send the updated identity file to the file system and receive a third identifier fed back by the file system. The second device receives the third identifier sent by the first access control node, where the third identifier is used to request the updated identity file from the file system.

Therefore, in this implementation, when a device requests an identity file of the device itself, an access control node may perform, based on an identity credential of a requester, verification on whether the device has permission to access the identity file. After verification succeeds, the access control node may feed back the identity file to the requester, to improve security of the identity file of the device.

According to a third aspect, this disclosure provides a device management method, applied to a device management system. The device management system includes a second device, a first access control node, a file system, a first device, a database node, and a blockchain node. A database for storing data is deployed on the database node. The first device is associated with the second device. The method includes: The first access control node receives an identity file sent by the second device, where the identity file includes identity information of the first device and a public key of the second device, and the identity file may indicate an association between the first device and the second device. The first access control node requests association information of the first device from the database node based on the identity file, where the association information includes a public key of a device associated with the first device, and the association information is obtained by the database node from the blockchain node. If the first access control node determines, based on the association information, that the first device is associated with the second device, the first access control node sends the identity file to the file system, to indicate the file system to store the identity file. The first access control node receives a first identifier fed back by the file system, and sends the first identifier to the second device, where the first identifier is used to read the identity file from the file system.

Therefore, in an implementation of this disclosure, the database node can obtain the association information of the first device from data stored in the blockchain node. The association information includes the information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management method provided in this disclosure, the access control node can be used to perform access control on a device that accesses the system or the second device, verify permission of the device that accesses the system, and allow the device to perform further processing, such as data storage or data reading, only when the device has the permission to access the system, thereby improving privacy and security of data transmission in the system.

In a possible implementation, that the first access control node requests association information of the first device from the database node based on the identity file may include: If the first access control node determines, based on a signature carried in the identity file, that the identity file is complete, the first access control node requests the association information of the first device from the database node based on the identity file.

Therefore, in this implementation, after determining that the identity file is complete, the access control node requests the association information of the device from the database node, which is equivalent to requesting the association information of the device only when it is ensured that the identity file is complete.

In a possible implementation, the method may further include: The first access control node receives an identity request message sent by the second device, where the identity request message carries a public key of the first device and the public key of the second device, and the identity request message is used to request the identity file. The first access control node sends a first request message to the database node, where the first request message includes information about the first device, such as the public key, a name, another identifier, or the like of the first device. The first access control node receives the first identifier sent by the database node. The first access control node sends the first identifier to the file system, and receives the identity file fed back by the file system. If the public key included in the identity file matches the public key of the second device, the first access control node sends the identity file to the second device.

Therefore, in this implementation, the access control node may request the first identifier from the database node, so that the identity file can be read from the file system based on the first identifier.

In a possible implementation, the method may further include: The first access control node receives an identity credential sent by the first device, where the identity credential includes an identifier of the first device. The first access control node performs verification on the identity credential. If verification on the identity credential succeeds, the first access control node sends a second request message to the database node, where the second request message includes the identifier of the first device. The first access control node receives the first identifier sent by the database node. The first access control node sends the first identifier to the file system, and receives the identity file fed back by the file system. If an identifier included in the identity file matches the identifier of the public key of the first device, the first access control node sends the identity file to the first device.

Therefore, in this implementation, an access control node can perform access control on query of a device for an identity file of the device itself, and transmit the identity file to the device only after verification on an identity credential succeeds, to improve data security of the device.

In a possible implementation, the device management system further includes a registration server.

That the first access control node receives an identity credential sent by the first device includes: The first access control node receives the identity credential forwarded by the registration server, where the identity credential is sent by the first device to the registration server through an encrypted channel between the first device and the registration server.

That the first access control node sends the identity file to the first device may include: The first access control node sends the identity file to the first device by using the registration server.

Therefore, in this implementation, data transmitted between the first device and the first access control node may be transmitted through the encrypted channel between the first device and the registration server, thereby improving security of data transmission between the first device and the first access control node.

In a possible implementation, the method may further include: The first access control node receives an updated identity file sent by the second device. The first access control node sends the updated identity file to the file system, and receives a third identifier fed back by the file system. The first access control node sends the third identifier to the second device, where the third identifier is used to request the updated identity file.

In this implementation, the second device can transfer the first device to the third device. The second device writes the information about the third device into the identity file of the first device, and sends the identity file to the access control node, to notify the blockchain node that the first device has been transferred, so that the database node obtains transaction information of the blockchain node and updates the association information of the first device. Therefore, in this implementation, the second device can transfer the device by modifying the identity file of the first device, and ownership transfer of the device can be completed without a manual operation.

According to a fourth aspect, this disclosure provides a device management method, applied to a device management system. The device management system includes a second device, a first access control node, a file system, a first device, a database node, and a blockchain node. A database for storing data is deployed on the database node. The first device is associated with the second device. The method includes: The blockchain node receives registration information sent by the second device, where the registration information includes a public key of the first device and a public key of the second device. The blockchain node writes the public key of the first device and the public key of the second device into transaction information in a blockchain according to a smart contract corresponding to the first device, so that after obtaining transaction information of the blockchain node, the database node stores, in association information of the first device, the public key of the first device and the public key of the second device that are included in the transaction information. The association information includes information about a device associated with the first device.

In an implementation of this disclosure, the database node can obtain the association information of the first device from data stored in the blockchain node. The association information includes information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management system provided in this disclosure, the access control node can be used to perform access control on a device that accesses the system or the second device, verify permission of the device that accesses the system, and allow the device to perform further processing, such as data storage or data reading, only when the device has the permission to access the system, thereby improving privacy and security of data transmission in the system.

In a possible implementation, the method may further include: The blockchain node receives a first identifier, where the first identifier is used to request an identity file of the first device, and the first identifier is generated by the file system after the file system stores the identity file. The blockchain node writes the first identifier into transaction information of the first device according to the smart contract corresponding to the first device, so that after obtaining the transaction information of the blockchain node, the database node stores the first identifier in the association information.

Therefore, in this implementation, before storing the identity file of the first device in the file system, the second device further registers the first device in the blockchain node, so that the blockchain node can select a smart contract matching the first device to write information about the first device into the transaction information in the blockchain. Therefore, the database node obtains the transaction information of the blockchain node to generate the association information of the first device. The association information can indicate the device associated with the first device. Therefore, in a subsequent procedure, the access control node can verify ownership of the first device based on the association information stored in the database, thereby improving data security of the first device. In addition, the first device can be automatically registered according to a smart contract of a blockchain, which can be applied to a scenario with a large quantity of devices and has a strong generalization capability.

According to a fifth aspect, this disclosure provides a device management method, applied to a device management system. The device management system includes a second device, a first access control node, a file system, a first device, a database node, and a blockchain node. A database for storing data is deployed on the database node. The first device is associated with the second device. The method includes: The database node obtains transaction information in a blockchain of the blockchain node. The database node stores, in association information of the first device, a public key of the first device and a public key of the second device that are included in the transaction information, where the association information indicates information about a device associated with the first device.

In an implementation of this disclosure, the database node can obtain the association information of the first device from data stored in the blockchain node. The association information includes information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management system provided in this disclosure, the access control node can be used to perform access control on a device that accesses the system or the second device, verify permission of the device that accesses the system, and allow the device to perform further processing, such as data storage or data reading, only when the device has the permission to access the system, thereby improving privacy and security of data transmission in the system.

In a possible implementation, the method may further include: The database node receives an ownership request message sent by the first access control node, where the ownership request message carries an identifier of the first device. The database node sends the association information of the first device to the first access control node based on the identifier of the first device.

Therefore, in this implementation, after receiving an ownership request message, the database node searches for corresponding association information according to a public key of a device carried in the message, and feeds back the association information to the access control node.

According to a sixth aspect, an embodiment of this disclosure provides a second device. The second device has a function of implementing the device management method according to the second aspect. The function may be implemented by hardware, or may be implemented by hardware executing corresponding software. The hardware or the software includes one or more modules corresponding to the function.

According to a seventh aspect, an embodiment of this disclosure provides an access control node. The access control node has a function of implementing the device management method according to the third aspect. The function may be implemented by hardware, or may be implemented by hardware executing corresponding software. The hardware or the software includes one or more modules corresponding to the function.

According to an eighth aspect, an embodiment of this disclosure provides a blockchain node. The blockchain node has a function of implementing the device management method according to the fourth aspect. The function may be implemented by hardware, or may be implemented by hardware executing corresponding software. The hardware or the software includes one or more modules corresponding to the function.

According to a ninth aspect, an embodiment of this disclosure provides a database node. The database node has a function of implementing the device management method according to the fifth aspect. The function may be implemented by hardware, or may be implemented by hardware executing corresponding software. The hardware or the software includes one or more modules corresponding to the function.

According to a tenth aspect, an embodiment of this disclosure provides a second device, including a processor and a memory. The processor and the memory are interconnected through a line. The processor invokes program code in the memory to perform a processing-related function in the device management method according to any one of the possible implementations of the second aspect. Optionally, the second device may be a chip.

According to an eleventh aspect, an embodiment of this disclosure provides an access control node, including a processor and a memory. The processor and the memory are interconnected through a line. The processor invokes program code in the memory to perform a processing-related function in the device management method according to any one of the possible implementations of the third aspect. Optionally, the access control node may be a chip.

According to a twelfth aspect, an embodiment of this disclosure provides a blockchain node, including a processor and a memory. The processor and the memory are interconnected through a line. The processor invokes program code in the memory to perform a processing-related function in the device management method according to any one of the possible implementations of the fourth aspect. Optionally, the blockchain node may be a chip.

According to a thirteenth aspect, an embodiment of this disclosure provides a database node, including a processor and a memory. The processor and the memory are interconnected through a line. The processor invokes program code in the memory to perform a processing-related function in the device management method according to any one of the possible implementations of the fifth aspect. Optionally, the database node may be a chip.

According to a fourteenth aspect, an embodiment of this disclosure provides an apparatus. The apparatus may also be referred to as a digital processing chip or a chip. The chip includes a processing unit and a communication interface. The processing unit obtains program instructions through the communication interface. When the program instructions are executed by the processing unit, the processing unit is configured to perform a processing-related function according to any one of the possible implementations of the second aspect to the fifth aspect.

According to a fifteenth aspect, an embodiment of this disclosure provides a computer-readable storage medium including instructions. When the instructions are run on a computer, the computer is enabled to perform the method according to any one of the possible implementations of the first aspect to the fifth aspect.

According to a sixteenth aspect, an embodiment of this disclosure provides a computer program product including instructions. When the computer program product runs on a computer, the computer is enabled to perform the method according to any one of the possible implementations of the first aspect to the fifth aspect.

DESCRIPTION OF EMBODIMENTS

Figure 1:
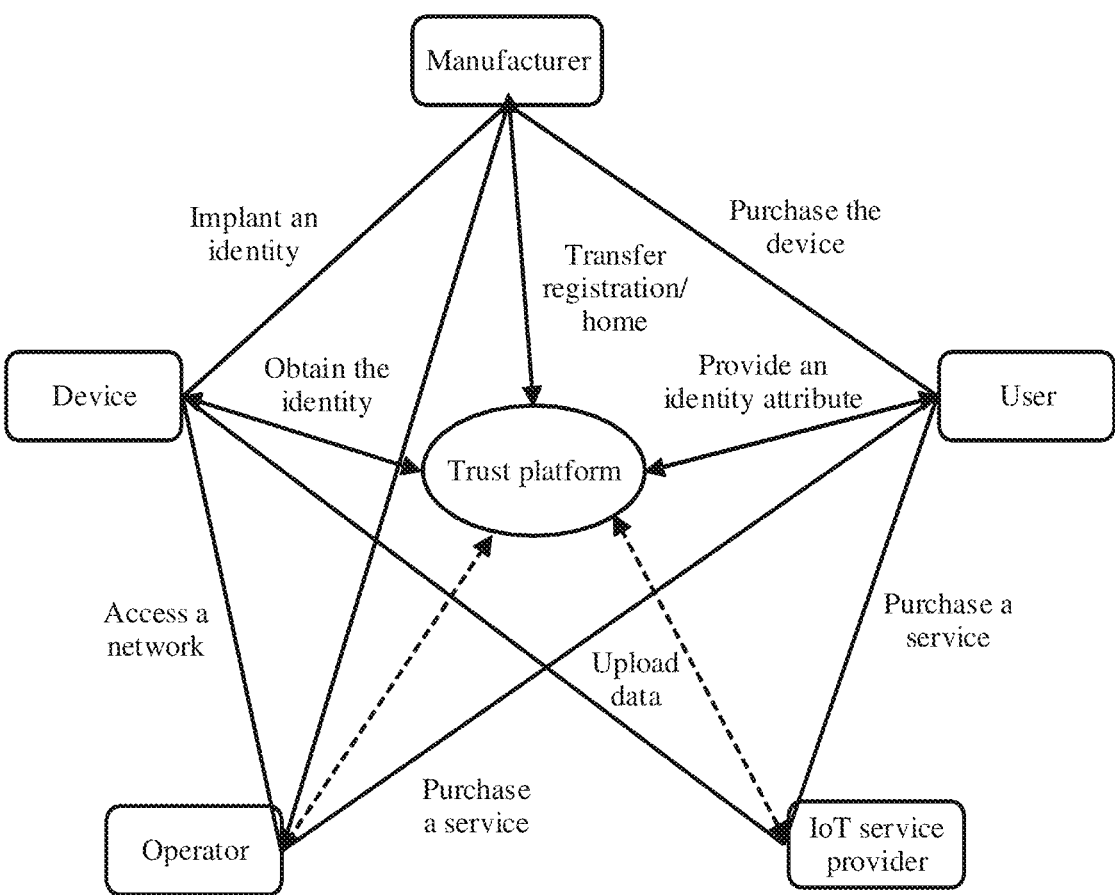
FIG. 1 is a schematic diagram of a structure of an example device management system according to an embodiment of this disclosure.

The following describes the technical solutions in embodiments of this disclosure with reference to the accompanying drawings in embodiments of this disclosure. It is clear that the described embodiments are merely some rather than all of embodiments of this disclosure. All other embodiments obtained by a person of ordinary skill in the art based on embodiments of this disclosure without creative efforts shall fall within the protection scope of this disclosure.

The system and the method provided in this disclosure can be adapted to various communication networks, and a greatly increasing quantity of devices access these communication networks. Therefore, management of the devices accessing these networks becomes an important topic.

For example, in some common manners, identity management is performed on the devices in a manual manner, including identity issuing, reclamation, transfer, and the like, which has difficulty in coping with challenges brought by identity management of a large quantity of devices. Some platforms can be used to automatically obtain a startup identity of a device. However, these platforms are private platforms, and protocols and platforms of these platforms are private. Openness is insufficient. Small-scale device manufacturers have difficulty in replication and high requirements are imposed on users. Therefore, these platforms cannot be widely promoted.

For another example, to overcome disadvantages of a dedicated platform, a zero-touch network access standard, for example, a bootstrapping remote secure key infrastructure (BRSKI), needs to be formulated for internet of things devices. As long as a manufacturer complies with the standard when producing a device, after a user also deploys a device according to the standard, the device can automatically obtain an identity of the device when accessing a network for the first time, and a buyer configures the device in advance. However, this standard also has a defect. Each manufacturer needs to deploy an identity management platform and interconnect with a plurality of manufacturers. Therefore, challenges are faced in terms of costs and ecosystem construction, and a generalization capability is weak.

In a scenario provided in this disclosure, a plurality of manufacturers, operators, and cloud service manufacturers may jointly construct a public identity management platform by using a blockchain technology, and implement functions such as device initialization identity issuing and ownership transfer based on the identity management platform.

A blockchain includes a series of increasing records, which are referred to as blocks. These blocks are linked together by using cryptography technologies, and each block includes a hash value of a previous block, a time stamp, transaction data, and the like. The blockchain is essentially a distributed multi-backup database. However, a biggest difference between the blockchain and a database is that data is stored based on multi-party consensus and a hash chain is used to protect historical data, preventing data from being tampered with. Compared with a conventional database technology, the blockchain data is more credible for a user because it cannot be tampered with, and therefore the blockchain data can better support multi-party cooperation. Another feature of the blockchain technology is that a smart contract is supported. The smart contract is a computer program that is automatically executed on the blockchain. The smart contract can reduce intermediate links of transactions and implement transaction automation.

The InterPlanetary File System (IPFS) protocol is a file storage and content distribution network protocol. It integrates a plurality of distributed systems and provides unified addressable data storage for users. The IPFS is essentially a P2P scale-out storage system. Unique code is generated based on file content to access file resources on the network. The IPFS can be combined with a decentralized blockchain technology to resolve problems in data storage security, user collaboration timeliness, and storage and bandwidth costs in a centralized internet architecture. An IPFS system uses erasure coding (EC) as a redundancy backup technology. m pieces of parity data are added for n pieces of original data. The original data can be restored based on any n pieces of data in n+m pieces of data, that is, a maximum quantity of tolerable failed data is m.

In some data storage scenarios, the blockchain and the IPFS can be used for file storage. A blockchain system is used to store file hashes and group IDs shared by files, and the IPFS system is used to store files. In addition, a key node, IPFS_Proxy, is introduced to the system. However, IPFS_Proxy can obtain file information stored by a user. In addition, a capability of uploading file records to a blockchain depends on IPFS_Proxy. Excessive IPFS_Proxy permission may cause system security risks, such as data content leakage or any other threat.

Therefore, this disclosure provides a device management system and a device management method, to automatically complete device access according to a smart contract of a blockchain. This disclosure is applicable to a scenario in which a large quantity of devices are connected, and is more conducive to data privacy protection.

First, the device management system and the device management method provided in this disclosure may be applied to various communication networks having a plurality of access devices, for example, a distributed network and an internet of things. In this disclosure, the internet of things is used as an example for description.

Generally, after a current internet of things device is produced and sold to a customer, the customer needs to issue an identity to the device through manual configuration. For example, the customer purchases a SIM card from an operator and inserts the SIM card into a SIM card slot in the device, and then the device can access a network by using this identity. This disclosure provides a trusted identity information sharing platform for a device manufacturer, a user, an operator, a device, and the like, so that the device automatically obtains a network access and service identity, ownership determining, and the like, thereby implementing zero-touch network access of the device.

For example, a device management system provided in this disclosure is shown in FIG. 1. After manufacturing a device, a manufacturer can implant an identity of the device into the device, and the manufacturer can register with a device management platform or transfer ownership of the device. Both an owner of the device and the device can obtain an identity file of the device from the device management platform.

The device can be transferred from the manufacturer to a user. The user can provide identity information of the user to the device management platform. The device management platform can update the owner of the device to the user in association information of the device. The owner, for example, the user, of the device may purchase a service from an operator or an IoT server. For example, the device may access a network through the operator, and may upload data through an IoT service provider.

Devices may communicate with each other over a limited or wireless network, for example, any one or any combination of a 5th-generation (5G) mobile communication technology system, a long term evolution (LTE) system, a global system for mobile communication (GSM), a code division multiple access (CDMA) network, a wideband code division multiple access (WCDMA) network, wireless fidelity (Wi-Fi), Bluetooth, ZigBee, a radio frequency identification (RFID) technology, long range (Lora) wireless communication, and near field communication (NFC).

Figure 2:
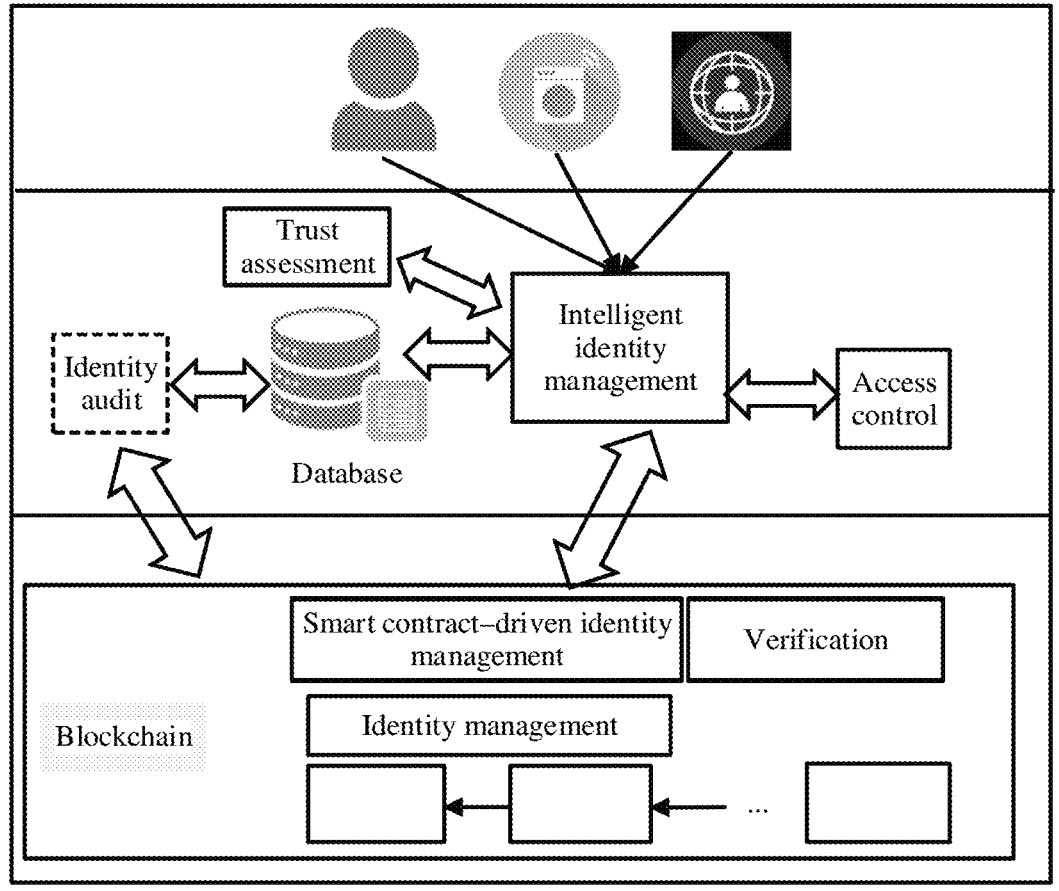
FIG. 2 is a schematic diagram of a structure of another example device management system according to an embodiment of this disclosure.

For example, a function of the device management platform may be shown in FIG. 2.

The device management platform may be divided into a plurality of parts, for example, may be divided into a blockchain part, an IPFS storage part (not shown in FIG. 2), a database part, and an access control part.

Blockchain part: An identity file stored on the device management platform is usually a core of device management. Therefore, information needs to be trustworthy. Therefore, in this disclosure, a tamper-resistant feature of a blockchain is used to ensure a trustworthiness attribute of device information recorded on the shared platform, and a smart contract is used to ensure that key data is recorded on the blockchain.

IPFS part: To overcome a limitation of a storage capability of the blockchain, in this disclosure, an IPFS decentralized file system may be used to store an identity file of a color swatch, and the blockchain is used to store an identity identifier of a device, home, a hash value of the identity file, and other data occupying less storage, to implement proper data distribution and maximize utilization of resources of each part.

Database part: To ensure correctness of identity information, a decentralized database system is used in this disclosure to filter correctness of device information. A plurality of nodes run independent databases to store device identity information obtained from the databases. Database information comes from device identity management information stored in the blockchain. Data insertion does not depend on manual modification, thereby improving efficiency, avoiding manual errors, and making data of each device more reliable.

Access control part: To ensure data privacy, in this disclosure, access control is configured, so that only a user with access permission can access an identity file of a device.

Figure 3:
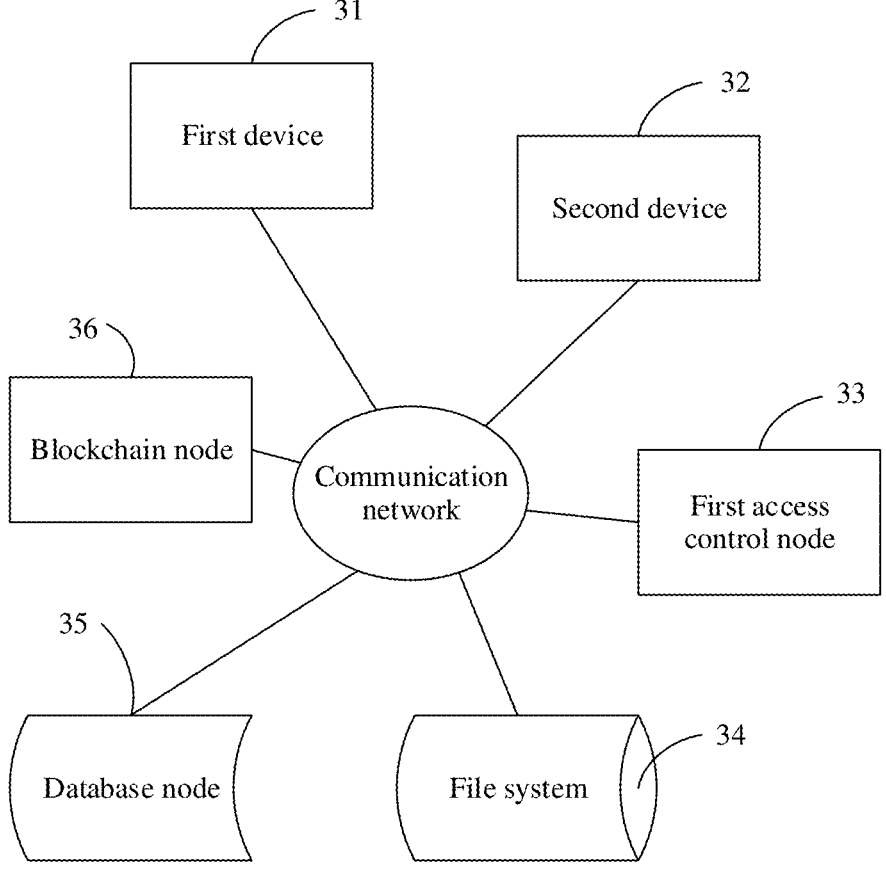
FIG. 3 is a schematic diagram of a structure of still another example device management system according to an embodiment of this disclosure.

FIG. 3 is a schematic diagram of a structure of an example device management system according to an embodiment of this disclosure.

The device management system may include a first device 31, a second device 32, a first access control node 33, a file system 34, a database node 35, and a blockchain node 36.

The second device 32 is configured to send an identity file to the first access control node 33, and the identity file includes identity information of the first device 31 and a public key of the second device 32.

The first access control node 33 is configured to request association information of the first device 31 from the database node 35 based on the identity file, the association information includes a public key of a device associated with the first device 31, and the association information is obtained by the database node 35 from the blockchain node 36.

If the first access control node 33 determines, based on the association information, that the first device 31 is associated with the second device 32, the first access control node 33 is further configured to send the identity file to the file system 34.

The file system 34 is configured to store the identity file and feed back a first identifier corresponding to the identity file to the first access control node 33, and the first identifier is used to read the identity file from the file system 34.

In an implementation of this disclosure, the database node can obtain the association information of the first device from data stored in the blockchain node. The association information includes information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management system provided in this disclosure, the access control node can be used to perform access control on a device that accesses the system or the second device, verify permission of the device that accesses the system, and allow the device to perform further processing, such as data storage or data reading, only when the device has the permission to access the system, thereby improving privacy and security of data transmission in the system.

In a possible scenario, before the sending an identity file to the first access control node 33, the second device 32 is further configured to send registration information to the blockchain node 36, and the registration information includes a public key of the first device 31 and a public key of the second device 32.

The blockchain node 36 is configured to: write the public key of the first device and the public key of the second device 32 into transaction information in a blockchain according to a smart contract corresponding to the first device 31, for registration of the first device.

The database node 35 is configured to: obtain transaction information of the blockchain node 36, and store, in the association information, the public key of the first device 31 and the public key of the second device 32 that are included in the transaction information.

Therefore, in this implementation, before storing the identity file of the first device in the file system, the second device further registers the first device in the blockchain node, so that the blockchain node can select a smart contract matching the first device to write information about the first device into the transaction information in the blockchain. Therefore, the database node obtains the transaction information of the blockchain node to generate the association information of the first device. The association information can include the information about the device associated with the first device. Therefore, in a subsequent procedure, the access control node can verify ownership of the first device based on the association information stored in the database, thereby improving data security of the first device. In addition, the first device can be automatically registered according to a smart contract of a blockchain, which can be applied to a scenario with a large quantity of devices and has a strong generalization capability.

In a possible scenario, the second device 32 is further configured to send the first identifier to the blockchain node 36.

The blockchain node 36 is further configured to update the first identifier to locally stored transaction information of the first device 31 according to the smart contract corresponding to the first device.

Therefore, in this implementation, after storing the identity file of the first device in the file system, the second device further stores, in the blockchain node, the first identifier fed back by the file system, so that the blockchain node stores the first identifier in the transaction information of the first device according to the smart contract. Therefore, when obtaining the transaction information again, the database node can update the first identifier to the association information of the first device, so that the association information of the first device includes more complete information of the first device.

In a possible scenario, the second device 32 is further configured to send an identity request message to the first access control node 33. The identity request message carries the information (such as a public key, a name, a sequence number, another identifier, or the like of the first device) about the first device 31 and the public key of the second device 32. The identity request message is used to request the identity file.

The first access control node 33 is further configured to send a first request message to the database node 35. The first request message includes the information about the first device 31.

The database node 35 is further configured to feed back the first identifier to the first access control node 33.

The first access control node 33 is further configured to: send the first identifier to the file system 34, and receive the identity file fed back by the file system 34.

If the public key included in the identity file matches the public key of the second device 32, the first access control node 33 is further configured to send the identity file to the second device 32.

In this implementation, the second device may further request the identity file of the first device from the access control node. The access control node may verify the public key carried in the received identity file and the public key carried in the identity request message. If the public keys match, it indicates that ownership of the device corresponding to the identity file is the second device, and the identity file may be transmitted to the second device. Therefore, in this implementation, the access control node can verify the ownership of the device, thereby ensuring security of the identity file of the device.

In a possible scenario, the first device 31 is further configured to send an identity credential to the first access control node 33. The identity credential includes the public key of the first device 31, to request the identity file from the first access control node 33.

The first access control node 33 is further configured to: if verification is performed on the identity credential and succeeds, send a second request message to the database node 35. The second request message includes an identifier (for example, the public key, the name, or the sequence number of the first device, or a unique identifier allocated to the first device) of the first device 31.

The database node 35 is further configured to feed back the first identifier to the first access control node 33.

The first access control node 33 is further configured to: send the first identifier to the file system 34, and receive the identity file fed back by the file system 34.

If an identifier included in the identity file matches the identifier included in the identity credential, the first access control node 33 is further configured to send the identity file to the first device 31.

In this implementation, the first device may query the access control node for the identity file of the first device. The access control node may perform verification on the identity credential of the first device, and send the identity file to the first device only after verification succeeds, thereby improving data security of the first device.

In a possible implementation, the first access control node 33 is specifically configured to: send a first request message to the database node, and receive the first identifier fed back by the database node, where the first request message includes the public key of the first device.

Therefore, in this implementation, the first access control node may obtain the first identifier from the database, to request the identity file of the first device from the file system based on the first identifier, and successfully obtain the identity file.

Certainly, the first identifier may also be sent by the second device to the first access control node, or in a registration process of the first device, the first access control node may store the first identifier, so that when the identity file is queried, the first identifier may be extracted from locally stored data.

In a possible implementation, the device management system further includes a registration server.

The first device 31 is specifically configured to send the identity credential to the registration server through an encrypted channel.

The registration server is configured to forward the identity credential to an access control server through an encrypted channel.

The first access control node 33 is specifically configured to send the identity file to the registration server.

The registration server is specifically configured to forward the identity file to the first device 31.

Therefore, in this implementation, data transmitted between the first device and the first access control node may be transmitted through the encrypted channel between the first device and the registration server, thereby improving security of data transmission between the first device and the first access control node.

In a possible scenario, the device management system further includes a second access control node.

The first device 31 is configured to send a third request message to the second access control node.

The second access control node is configured to obtain a second identifier of the identity file after verification is performed on the third request message and succeeds.

The second access control node is further configured to feed back the second identifier to the first device 31.

The first device 31 is further configured to: when it is verified that the first identifier matches the second identifier, store the identity file.

In this implementation, a plurality of access control nodes may be disposed in the device management system. After the identity file is obtained by using the first access control node, the second identifier may be further obtained by using the second access control node. Then, it is verified whether the first identifier matches the second identifier. If the first identifier matches the second identifier, it is determined that the identity file is a correct file, and the identity file may be stored, to ensure accuracy of the obtained identity file.

In a possible scenario, the device management system further includes a third device.

The second device 32 is further configured to add information about the third device to the identity file, to obtain an updated identity file. The information about the third device may include a public key of the third device. The updated identity file indicates that the first device is associated with the third device, that is, the device associated with the first device is changed from the second device to the third device.

The second device 32 is further configured to send the updated identity file to the first access control node 33.

The first access control node 33 is further configured to: send the updated identity file to the file system 34, and receive a third identifier fed back by the file system 34.

The first access control node 33 is further configured to send the third identifier to the second device 32.

The second device 32 is further configured to send the third identifier to the third device, where the third identifier is used to request the updated identity file from the file system 34.

The second device 32 is further configured to send update information to the blockchain node 36, where the update information includes the public key of the first device 31, the public key of the third device, and the third identifier.

The blockchain node 36 updates the transaction information based on the update information, to obtain updated transaction information.

The database node 35 is further configured to: obtain the updated transaction information, and update the association information based on the updated transaction information, to obtain updated association information.

In this implementation, the second device can transfer the first device to the third device. The second device writes the information about the third device into the identity file of the first device, and sends the identity file to the access control node, to notify the blockchain node that the first device has been transferred, so that the database node obtains transaction information of the blockchain node and updates the association information of the first device. Therefore, in this implementation, the second device can transfer the device by modifying the identity file of the first device, and ownership transfer of the device can be completed without a manual operation.

In a possible implementation, the first identifier is obtained by the file system by performing an operation on the identity file according to a hash algorithm.

Figure 4:
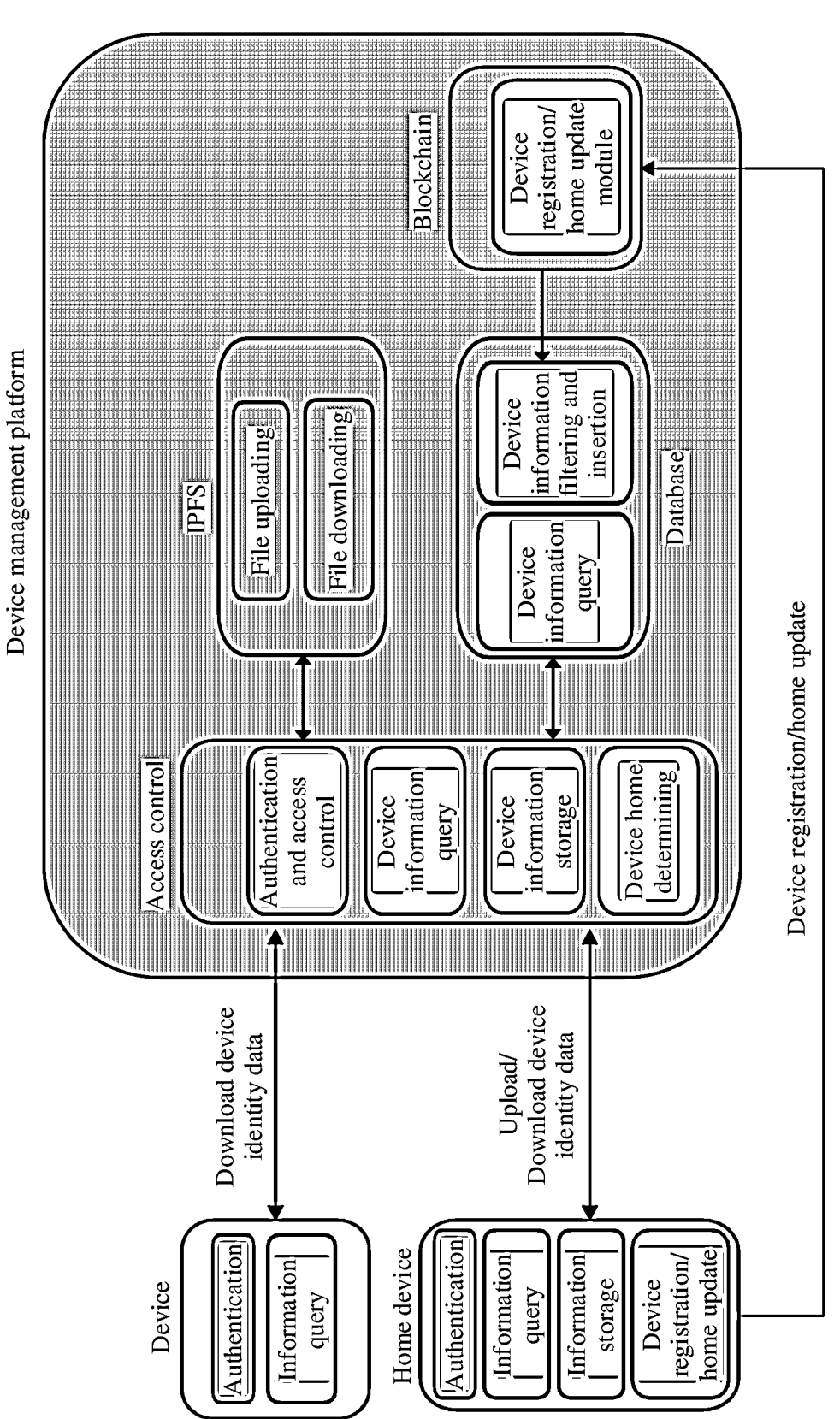
FIG. 4 is a schematic diagram of a structure of yet another example device management system according to an embodiment of this disclosure.

For ease of understanding, an example in which the file system is an IPFS is used to describe the device management system provided in this disclosure. FIG. 4 is a schematic diagram of a structure of another example device management system according to an embodiment of this disclosure.

An access control node, an IPFS, a database, a blockchain node, and the like may form a device management platform, to provide services such as authentication and identity management for a device and ownership of the device.

The following separately describes functions of each device or provided services.

1. Device (Namely, a First Device)

Authentication and information query needs to be performed on the device.

Authentication: A pre-implanted key, such as an X.509 certificate or a private key corresponding to an IBS public key, can be used to generate a signature for authentication with an external node, such as an access control system. In addition, the external node is determined to be a node authorized by the device for access. For example, a domain name or an IP address of the external node is a domain name or an IP address implanted during device production.

Information query: Identity information of the device is obtained from an access control node.

2. Ownership Device (Namely, a Second Device, or Referred to as a Device Owner)

The ownership device is a device associated with the device, and may be a server or a terminal, or may be a service provided for a user in another manner, for example, a web page or an app.

The ownership device usually needs to perform authentication, information query, information storage, device registration, ownership update, or the like.

Authentication: A signature may be generated by using a pre-generated private key, authentication is performed with an external node, for example, an access control node, and whether an external device is an authorized device for access is also determined.

Information query: Another device can be assisted in obtaining an identity file of a device from the access control node.

Information storage: An identity file of a device can be sent to the access control node.

Device registration and ownership update: A smart contract deployed on a blockchain node can be invoked to write information such as ownership of a device, an identity file, or a hash value of the identity file.

3. Access Control Node

The access control node may be configured to perform access control on a device that accesses the device control platform, perform authentication on a device that accesses the device control platform, or perform information query, for example:

Authentication and access control: An identity of a device or an ownership device may be determined, a signature may be signed based on a private key controlled by the access control node, and an identity of the access control node may be proved to the device or the ownership device.

Information query: An identity file of a device may be obtained from the IPFS, and the identity file may be fed back to a querier after an identity query request is received from the querier and it is determined that the querier has permission to access the identity file.

Information uploading: An identity file of a device sent by a device owner may be received, the identity file may be written into the IPFS after it is determined that the device owner has permission to update or upload the identity file of the device, and file verification code returned by the IPFS, such as a hash value or an address generated in another manner, is fed back to the device owner.

Device ownership determining: An ownership query request may be initiated to a database to query information such as association information and a hash value of a device, to determine ownership of the device.

4. Database Node

The database node may be configured to: insert information about a device, perform information query, or the like.

Device information filtering and insertion: Transaction information related to an identity of a device may be extracted from a blockchain node, and the transaction information is stored in a database. Generally, if association information of the device already exists in the database, the association information of the device may be updated after information related to the identity of the device included in the transaction information is obtained. If the association information of the device does not exist in the database, the association information of the device is generated after the information related to the identity of the device included in the transaction information is obtained. When data is inserted into the database, whether an initiator of a transaction record is an owner of the device needs to be determined. If yes, the association information of the device is updated. If no, the association information of the device is not updated.

Device information query: If a device or a device owner queries an identity file of a device, the database node may provide the identity file of the device to an access control node.

5. Blockchain Node

The blockchain node may be configured to perform device registration, information update, and the like. The blockchain node may interact with a smart contract module deployed on the blockchain node, select a smart contract that matches a device or a manufacturer of the device, perform registration of the device, and write device information, a hash value of an identity file, updated device ownership information, and the like into a blockchain.

Figure 5:
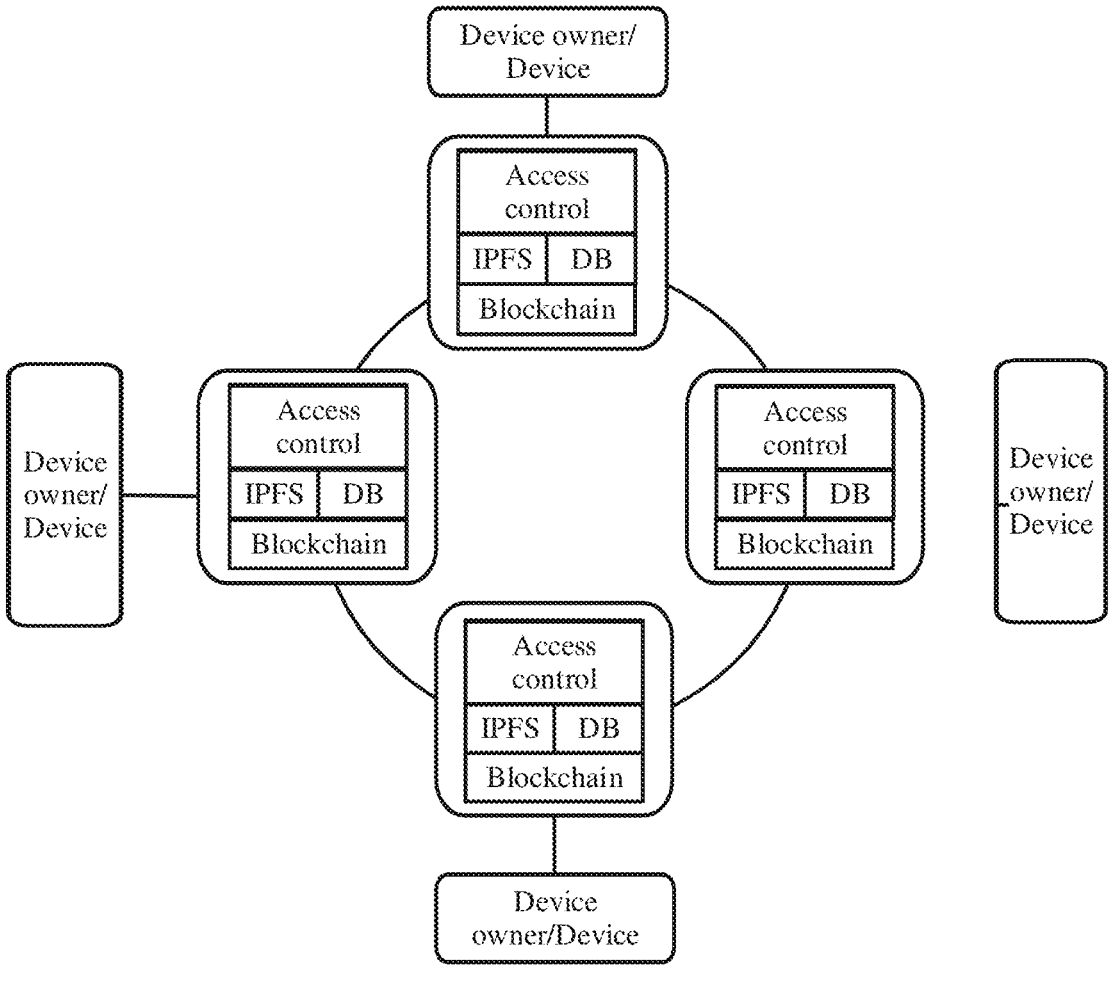
FIG. 5 is a schematic diagram of a structure of still yet another example device management system according to an embodiment of this disclosure.

For example, for a deployment manner of the device management system provided in this disclosure, refer to FIG. 5.

The device management system includes N nodes, including a blockchain node, an IPFS, a database node (DB), and an access control node. The nodes are connected over a wired or wireless network.

Therefore, this disclosure provides a decentralized device management system, to implement device management functions such as device registration, information update, identity verification, or information query by using a plurality of independently running nodes. A smart contract is used to manage a device, has a strong generalization capability, and is applicable to a plurality of scenarios. In addition, the access control node is used to verify permission of a querier of data of a device, so that data security of the device can be improved.

The foregoing describes an architecture of the device management system provided in this disclosure. The following describes in more detail procedures of the device management system and the device management method provided in this disclosure.

Figure 6:
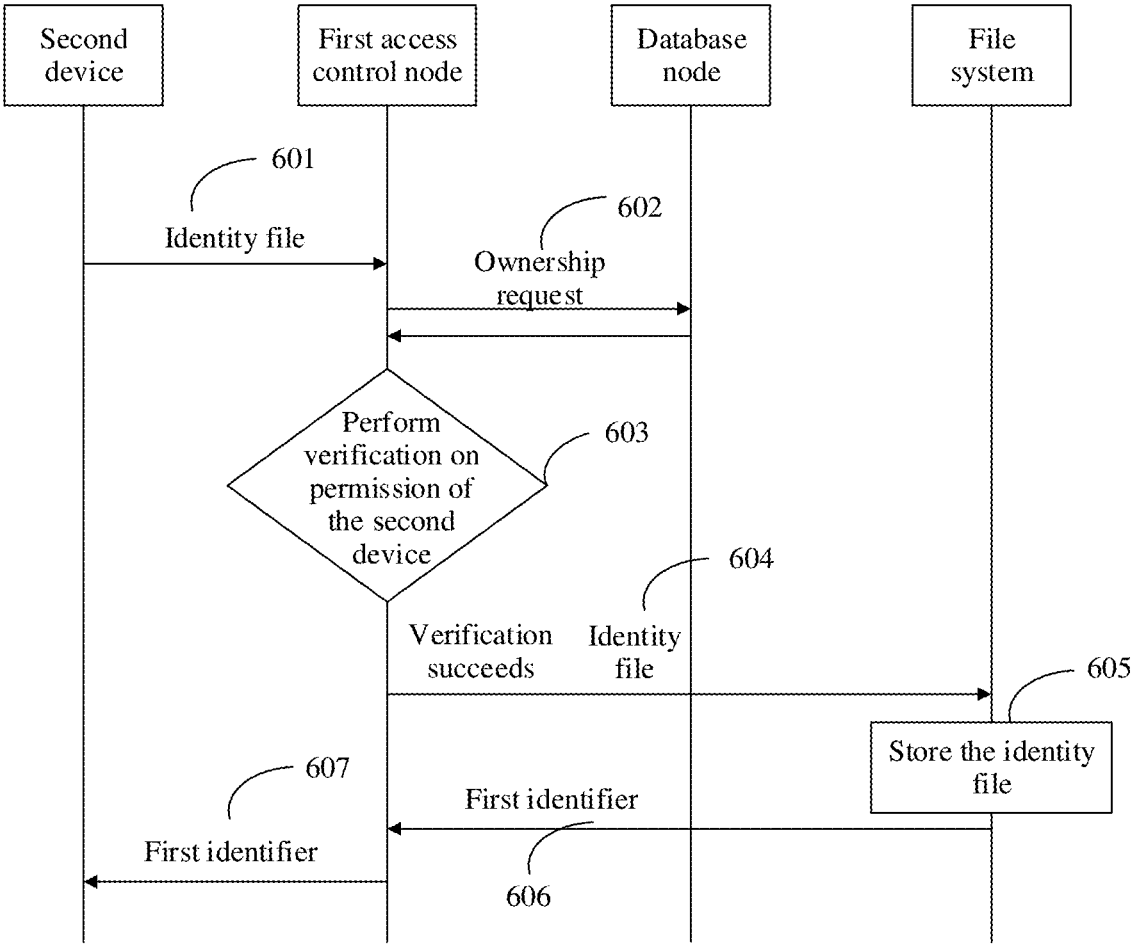
FIG. 6 is a schematic flowchart of an example device management method according to an embodiment of this disclosure.

FIG. 6 is a schematic flowchart of an example device management method according to an embodiment of this disclosure. Details are described as follows.

601: A second device sends an identity file to a first access control node.

The second device is a user associated with a first device, namely, an owner of the first device, and the user may be carried on a server or a terminal. For example, a device management system provided in this disclosure may provide a service for the user in a form of a client. The user may log in to an account on a local PC end, that is, may use a local client as the second device. For another example, the device management system provided in this disclosure may provide a service for the user by using an app installed on a user terminal, and the user may perform registration, identity query, or the like on the app for a device owned by the user, that is, may use a terminal as a second device.

The identity file may include identity information of the first device, information about the second device, and/or the like. The identity information of the first device may include, for example, a public key, a name, a sequence number, or an address of the first device, or a unique identifier allocated to the first device. The information about the second device is, for example, a public key, a name, a unique identifier, or an address of the second device.

In addition, the identity file may indicate that the first device is associated with the second device. For example, the second device may be a device that carries an account of the user. After the user purchases the first device, that is, the second device belongs to the user, the user may bind the first device to the account, that is, add the information about the second device to the identity file of the first device and upload the information to a device management platform, so that the first device is associated with the second device on the platform.

In a possible implementation, before the sending an identity file to the first access control node, the second device further sends registration information to a blockchain node. The registration information may include information about the first device and the information about the second device, for example, the public key, a unique identifier, or the sequence number of the first device, and the public key, the unique identifier, or a sequence number of the second device. The blockchain node writes the information about the first device and the public key of the second device into transaction information of a blockchain according to a smart contract corresponding to the first device, to perform registration for the first device. The smart contract corresponding to the first device may indicate a registration manner of the first device. A smart contract corresponding to each device may be determined based on a pre-configured mapping relationship. The database node obtains transaction information of the blockchain node, and stores the public key of the first device and the public key of the second device that are included in the transaction information into association information, to complete registration of the first device.

The smart contract is a computer protocol that aims to spread, verify, or execute contracts in an informatization manner. The smart contract allows trusted transactions to be performed without a third party. These transactions are traceable and irreversible. A plurality of smart contracts may be pre-configured in the blockchain node. Each manufacturer or each device may have a same smart contract or different smart contracts. The smart contract may indicate a registration manner, a transaction manner, a data storage format, or the like of the device. In an implementation of this disclosure, the method and the system provided in this disclosure may be adapted to more scenarios according to smart contracts, are compatible with more devices produced by different manufacturers, and have strong generalization capabilities.

For example, after a manufacturer produces a device, the first device may be registered in the device management system. The manufacturer (namely, the second device) sends registration information to the blockchain node. The blockchain node determines a smart contract that matches the first device, and writes information about the first device into a block according to the smart contract. When obtaining the transaction information of the blockchain, the database node generates association information of the first device. The association information includes the information about the first device and information about a device associated with the first device, so that the access control node may learn, based on the association information of the first device stored in the database, of ownership of the first device, to determine a device having permission to update or query the information about the first device.

602: The first access control node requests the association information of the first device from the database node.

After receiving the identity file sent by the second device, the first access control node may send an ownership request message to the database node, to request the association information of the first device from the database node. The association information includes the information about the device associated with the first device. The first access control node may learn, based on the association information, of the information about the device associated with the first device.

For example, the association information may include the information about the first device and the information about the second device, for example, the name, the sequence number, the public key or a hash value of the first device, or a certificate, the public key, or a hash value of the second device.

603: The first access control node performs verification on permission of the second device.

After obtaining the association information of the first device from the database node, the first access control node may learn of the information about the device associated with the first device, such as a public key, a name, or another identifier, and determine whether the second device is associated with the first device. If it is determined that the first device is associated with the second device, it indicates that the second device has permission to upload the identity file of the first device. If it is determined that the second device is not associated with the first device, it indicates that the second device does not have the permission to upload the identity file of the first device. In this case, the identity file sent by the second device may be discarded.

For example, if a public key of the owner included in the association information is the same as the public key of the second device, it may be determined that the first device is associated with the second device. If the public key of the owner included in the association information is different from the public key of the second device, it is determined that the first device is not associated with the second device. In this case, the received identity file may be discarded.

604: If verification succeeds, the first access control node sends the identity file to a file system.

If the first access control node determines that the first device is associated with the second device, the access control node may determine that the second device may upload the identity file of the first device, and may send the identity file to the file system, to store the identity file in the file system.

605: The file system stores the identity file.

After receiving the identity file sent by the first access control node, the file system stores the identity file.

The file system may be a file system deployed on a server, may be a scale-out storage system, or may be a centralized storage system. After receiving the identity file, the file system stores the identity file in the file system.

606: The file system sends a first identifier corresponding to the identity file to the first access control node.

After storing the identity file of the first device, the file system may generate the first identifier of the identity file and feed back the first identifier to the first access control node.

The first identifier may be a storage address of the identity file in the file system, may be an identifier generated based on the storage address of the identity file, may be an identifier generated based on content of the identity file, or the like. For example, there are a plurality of manners of generating the first identifier. The first identifier may be output according to a hash algorithm, for example, a message-digest algorithm (MD4), MD5, or a secure hash algorithm (SHA), when, for example, the storage address of the identity file is used as an input of the foregoing algorithm, or the content of the identity file is used as an input of the foregoing algorithm.

For ease of understanding, in the following implementations of this disclosure, an example in which the first identifier is a hash value is used for description. To be specific, a first identifier, a second identifier, a third identifier, or the like mentioned below may be an identifier obtained according to the foregoing algorithm. The following uses only the hash value as an example for description.

607: The first access control node feeds back the first identifier to the second device.

After receiving the first identifier, the first access control node may feed back the first identifier to the second device, so that the second device may subsequently request, based on the first identifier, the first access control node to query the identity file.

Therefore, in an implementation of this disclosure, the database node can obtain the association information of the first device from data stored in the blockchain node. The association information includes the information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management method provided in this disclosure, the access control node can be used to perform access control on a device that accesses the system or an ownership device, verify permission of the device that accesses the system, and allow the device to perform further processing, such as data storage or data reading, only when the device has the permission to access the system, thereby improving privacy and security of data transmission in the system.

In a possible implementation, the second device further sends the first identifier to the blockchain node. The blockchain node records the first identifier in the transaction information of the first device according to the smart contract. The database node may periodically obtain the transaction information, or obtain the transaction information after it is detected that the transaction information is updated, to update the information about the first device in the transaction information to the association information of the first device, that is, update the first identifier to the association information of the first device, to obtain complete association information of the first device.

In a possible implementation, the second device may further send an identity request message to the first access control node. The identity request message carries the information about the first device and the public key of the second device, and the identity request message requests the identity file. The first access control node may further obtain the first identifier and send the first identifier to the file system, to receive the identity file fed back by the file system. If the public key of the owner of the device included in the identity file matches the public key of the second device, that is, the first device is associated with the second device, the first access control node further sends the identity file to the second device. If the public key included in the identity file does not match the public key of the second device, the identity file may not be sent to the second device, or a query failure may be fed back to the second device. Therefore, in this implementation, the first access control node may verify whether a requester requesting the identity file of the first device has permission to read the identity file of the device, and feed back the identity file to the requester only when the requester has the permission to read the identity file, thereby improving data security of the device and protecting privacy of the device.

In a possible implementation, to further improve data security, the device management system may further include a second access control node, and the second device may further send a third request message to the second access control node. The second access control node obtains a second identifier of the identity file after verification is performed on the third request message and succeeds. The second access control node further feeds back the second identifier to the first device. When it is verified that the first identifier matches the second identifier, the second device stores the identity file. Therefore, in this implementation, the second device may separately request identity files and identifiers corresponding to the identity files from a plurality of access control nodes. When identifiers fed back by the plurality of access control nodes match, it indicates that received identity files are accurate, and the accurate identity files may be stored.

In a possible implementation, the first device may further send an identity credential to the first access control node. The identity credential includes an identifier of the first device, and the identifier may be the public key, the sequence number, or another unique identifier of the first device, to request the identity file of the first device from the first access control node. The first access control node further sends a second request message to the database node if verification is performed on the identity credential and succeeds. The second request message includes the public key of the first device. The database node further feeds back the first identifier to the first access control node. The first access control node further sends the first identifier to the file system, and receives the identity file fed back by the file system. If the identifier included in the identity file matches the identifier of the first device, the first access control node further sends the identity file to the first device. Therefore, in this implementation, when a device requests an identity file of the device itself, an access control node may perform, based on an identity credential of a requester, verification on whether the device has permission to access the identity file. After verification succeeds, the access control node may feed back the identity file to the requester, to improve security of the identity file of the device.

In a possible implementation, to further improve data security, the device management system may further include a second access control node, and the first device may further send a third request message to the second access control node. The second access control node obtains a second identifier of the identity file after verification is performed on the third request message and succeeds. The second access control node further feeds back the second identifier to the first device. When it is verified that the first identifier matches the second identifier, the first device stores the identity file. When the first identifier does not match the second identifier, the first device may request the identity file from the first access control node or the second access control node again until an accurate identity file is obtained. Therefore, in this implementation, the first device may separately request identity files and identifiers corresponding to the identity files from a plurality of access control nodes. When identifiers fed back by the plurality of access control nodes match, it indicates that received identity files are accurate, and the accurate identity files may be stored.

In a possible implementation, the first access control node may specifically send a first request message to the database node, to request the first identifier from the database node. The first request message may include the public key of the first device. After receiving the first request message, the database node may search locally stored data for the association information of the first device based on the public key carried in the first request message, and feed back the first identifier included in the information to the first access control node. Therefore, in this implementation, the access control node may obtain accurate association information of the device from the database, and obtain the identity file of the device from the file system, which is equivalent to that a plurality of nodes need to participate in a process of obtaining the file, thereby reducing a possibility of data leakage. In addition, the access control node verifies read permission, thereby improving data security of the device.

In a possible implementation, the second device further adds information about a third device to the identity file, to obtain an updated identity file. The information about the third device includes a public key of the third device. The second device further sends the updated identity file to the first access control node. The first access control node further sends the updated identity file to the file system, and receives a third identifier fed back by the file system. The first access control node further sends the third identifier to the second device. The second device further sends the third identifier to the third device. The third identifier indicates to request the updated identity file from the file system. The second device further sends update information to the blockchain node. The update information includes the public key of the first device, the public key of the third device, and the third identifier. The blockchain node updates the transaction information based on the update information, to obtain updated transaction information. The database node further obtains the updated transaction information, and updates the association information based on the updated transaction information, to obtain updated association information.

In this implementation, the ownership of the first device may be changed from the second device to the third device. The second device adds information about the third device to the identity file, that is, changes the ownership of the first device to the third device, uploads the updated identity file to the file system, and updates the association information stored in the database, to complete device transfer. Therefore, according to the method provided in this disclosure, device transfer can be accurately and efficiently completed, to adapt to a scenario in which device transfer needs to be performed, and a generalization capability is strong.

The foregoing describes a procedure of the device management method provided in this disclosure. According to the device management method provided in this disclosure, registration, identity update, identity query, device transfer, and the like can be performed on a device. For example, after the device is registered, identity query or identity transfer may be performed.

For ease of understanding, the following separately describes procedures such as registration, identity query, and device transfer based on examples. For example, the file system may be any type of file system for storing data, for example, a constructed distributed file system or an IPFS. In this disclosure, the IPFS is used as an example for description. The device owner may be a manufacturer or a user. The following uses an example in which the device owner is a manufacturer for description.

It should be noted that procedures such as device registration, identity query, and device transfer mentioned in the following embodiments may be implemented in combination, or may be separately implemented. The procedures may be adjusted based on an actual application scenario. This is not limited in the following embodiments of this disclosure.

1. Device Registration

Figure 7A:
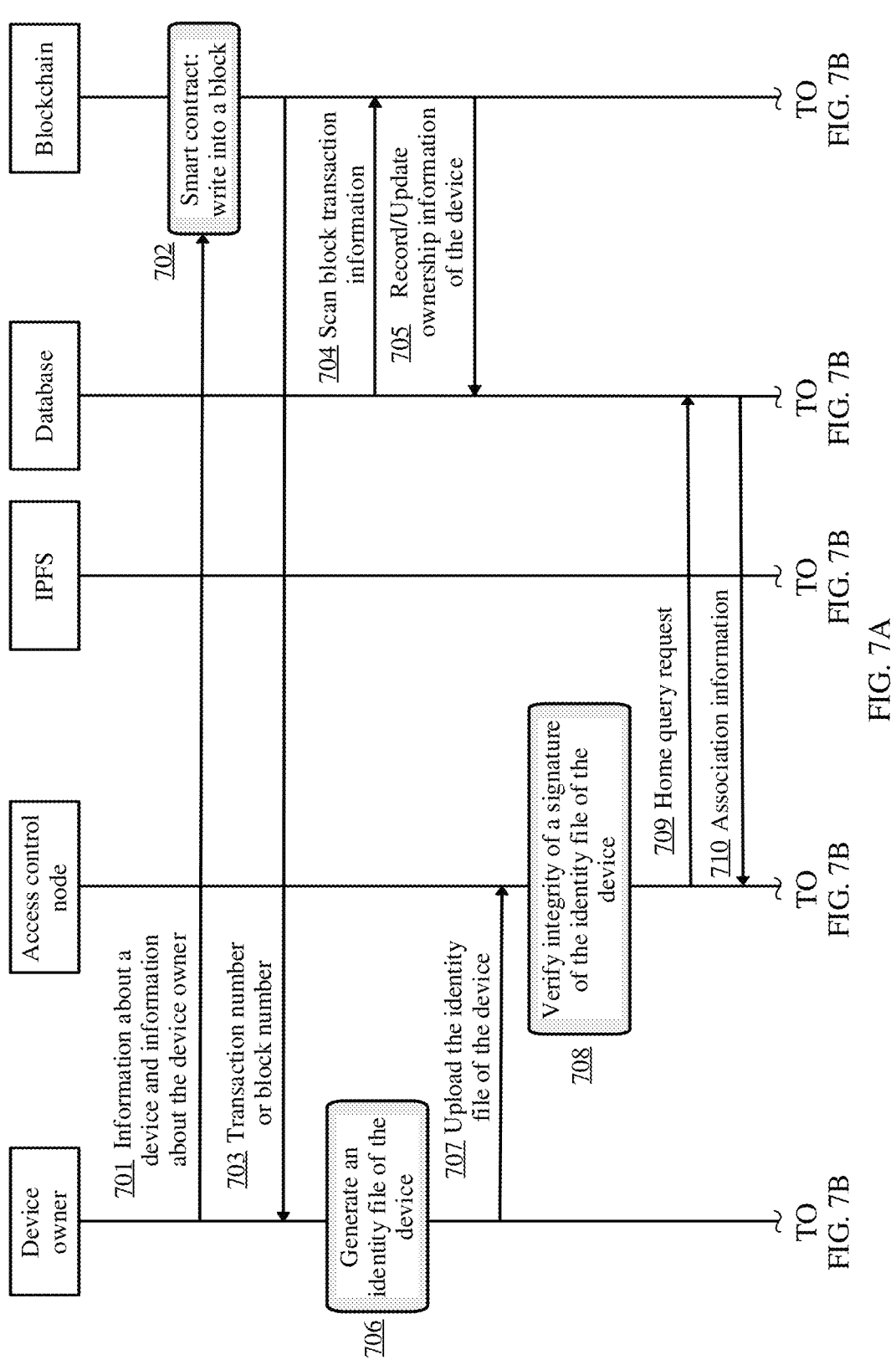
FIG. 7A and FIG. 7B are a schematic flowchart of another example device management method according to an embodiment of this disclosure.
Figure 7B:
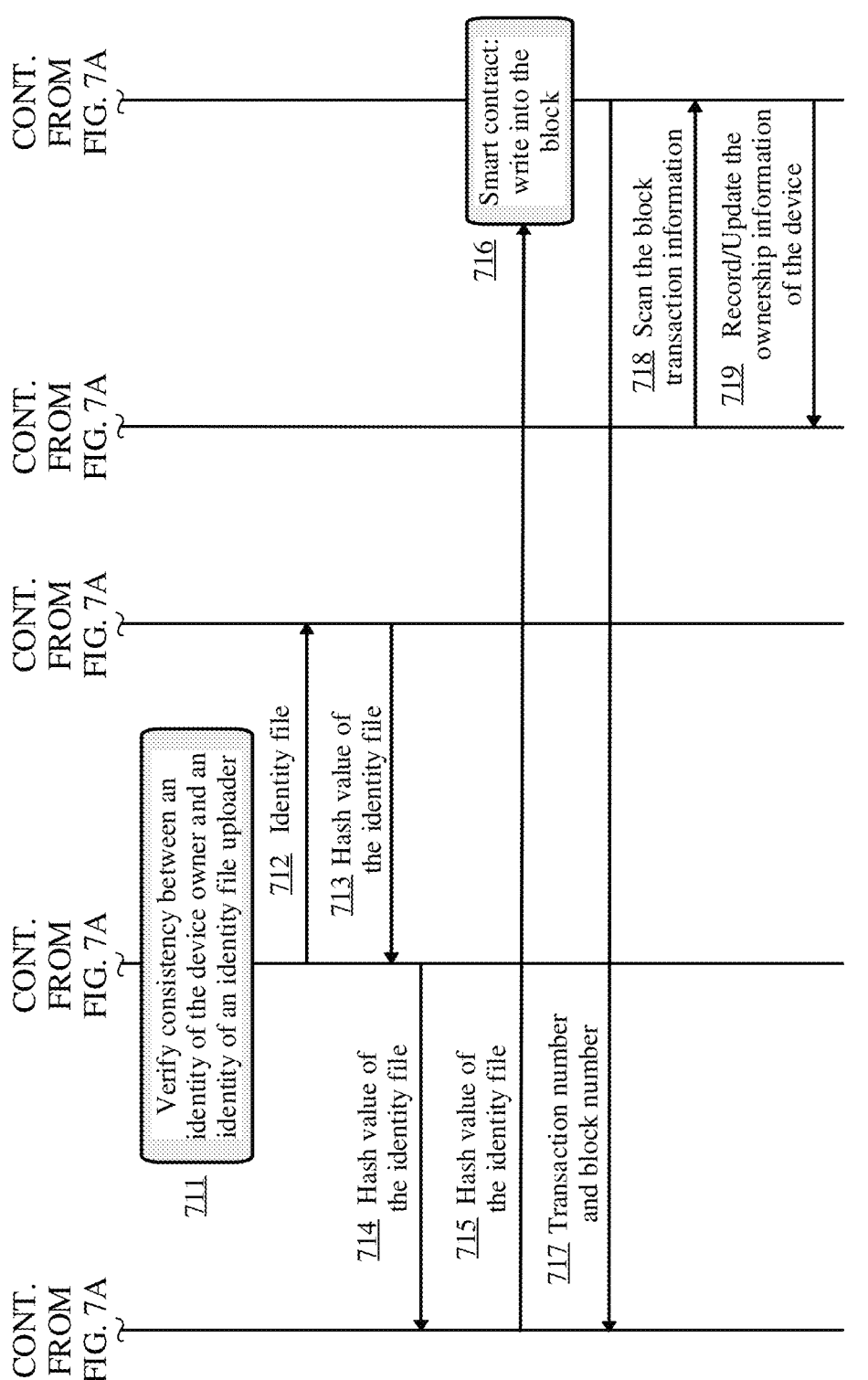

FIG. 7A and FIG. 7B are a schematic flowchart of an example device management method according to an embodiment of this disclosure.

701: A device owner sends information about a device and information about the device owner to a blockchain.

The device owner (that is, the second device, referred to as the device owner herein for ease of understanding) may send registration information to the blockchain. The registration information may include the information about the device and the information about the device owner, to register the device with the blockchain.

The information about the device may include information such as a public key of the device, a hash value of the public key, a certificate, a sequence number of the device, a device name, or a device identifier.

The information about the device owner may include a public key of the device owner, a hash value of the public key, a certificate of the device owner, or an identifier of the device owner.

For example, if the device owner is a manufacturer, the manufacturer may initiate, based on a blockchain account of the manufacturer, a registration request to a smart contract deployed on the blockchain. The registration request may carry information such as the identity identifier of the device and a device identifier of the manufacturer, for example, the public key of the device, the hash value of the public key of the device, a public key of the manufacturer, or a hash value of the public key of the manufacturer.

702: The blockchain (namely, a blockchain node) writes the received information to a block according to the smart contract.

After receiving the registration information sent by the device owner, the blockchain may determine the smart contract that matches the device, and write the received registration information, that is, the information about the device and the information about the device owner, into the block according to the smart contract.

The smart contract may be determined based on a pre-configured mapping relationship. The mapping relationship may be a mapping relationship between the device and the smart contract, or may be a mapping relationship between the manufacturer manufacturing the device and the smart contract. Alternatively, an address, an interface, or the like of the smart contract may be carried in the registration information. The smart contract may indicate a device registration manner, a device management manner, or the like. For example, the smart contract may indicate the registration information, an encryption manner, a data format, and the like that are required for registering the device.

Therefore, in this implementation, different smart contracts may be used to register devices of different manufacturers, to adapt to the devices of different manufacturers. The different manufacturers can be introduced only by accessing corresponding smart contracts, so that the devices of different manufacturers can be managed, and a generalization capability is strong.

703: The blockchain feeds back a transaction number or a block number to the device owner.

The blockchain writes the registration information into the block according to the smart contract, generates the transaction number or the block number, and feeds back the transaction number or the block number to the device owner, to notify the device owner that the registration information is written into the block.

704: A database scans block transaction information.

The database is usually carried in a server, and the server may read the transaction information in the block.

The database may periodically read the transaction information in the block, or read the transaction information after it is detected that the transaction information is updated. For example, the database may periodically send a read request to the blockchain, and receive the transaction information fed back by the blockchain.

For example, the database may periodically obtain information recorded in each block in the blockchain. Each time the blockchain generates a new data block, the database may extract identity information from the new block and perform filtering to obtain available information. If the database does not include association information of the device identified by the public key of the device, the association information is generated for the device and added to the database. If the association information of the device identified by the public key of the device already exists in the database, a blockchain account address of the device owner may be verified. If the address is the same as a blockchain account address for previous interaction with the device owner, it is determined to update the information about the device in the transaction information to the association information. During device transfer, an updated new owner address may be different from an original owner address.

705: The database records or updates the association information of the device.

After determining that the transaction information in the block is updated, the database may generate or update the association information of the device based on the transaction information in the block. The association information may be used to indicate information about a user associated with the device.

needs to be encrypted. There may be a plurality of encryption manners, and encryption may be performed based on a device public key or a device owner public key. For example, a specific encryption method may be performed based on a symmetric key K and according to a general encryption algorithm such as AES. The encryption key is used for encryption based on the public keys of the device and the device owner and stored in the identity file.

In addition, to ensure integrity of the identity file, a private key of the device owner may be used for signing, so that a receiving device may perform verification based on the device public key included in the identity file, for example, according to an RSA algorithm or an elliptic curve digital signature algorithm (ECDSA). Usually, the identity file of the device can be stored in the Jason format.

For example, the information included in the identity file of the device and an encryption manner of each piece of information may be specifically shown in Table 1.

TABLE 1

| | |
|---|---|
| Device information | Device name (which is encrypted based on a shared key) |
| | Device sequence number (which is encrypted based on the shared key) |
| | Device public key |
| | Device certificate, which is encrypted based on the shared key |
| | Shared key K, which is encrypted based on the public key of the device |
| Device ownership information | Name, which is encrypted based on the shared key |
| | Public key |
| | Identity certificate, which is encrypted based on the shared key |
| | Shared key K, which is encrypted based on the public key of the device owner (Usually, if signing and encryption of the device owner are performed based on different keys, the corresponding keys need to be included in the file and their functions need to be described.) |
| Information about next ownership | Public key |
| | Certificate, which is encrypted based on the shared key |
| Past ownership information | Ownership certificate 1, which is encrypted based on the shared key |
| | Ownership certificate 2, which is encrypted based on the shared key |
| Operator information | Operator name or code, which is encrypted based on the shared key |
| | Operator certificate, which is encrypted based on the shared key |
| Blockchain information | Smart contract address, which is encrypted based on the shared key |
| | Smart contract interface number, which is encrypted based on the shared key |
| | Blockchain wallet address of the owner (which is usually used to match the device owner public key) |
| Signature | The device owner uses its own private key to sign the identity information file to ensure that the identity file is not tampered with. |

If the association information of the device already exists in the database, after it is detected that the transaction information includes new information about the device, the new information may be updated to the association information of the device. If the association information of the device does not exist in the database, the association information of the device is generated after it is detected that a new block is added in the transaction information and the block includes the information about the device.

The association information may include the information about the device itself, such as the public key of the device, the hash value of the public key, the sequence number, the name, or another identifier, or may include the information about the owner of the device, such as the public key of the owner, the hash value of the public key, the sequence number, a name, or another identifier.

706: The device owner generates an identity file.

The device owner may generate the identity file of the device, including identity information of the device, identity information of the device owner, and other information that can identify a device identity or device ownership.

The identity file may specifically include a plurality of identity attributes of the device, and usually, the identity file

707: The device owner uploads the identity file to the access control node.

After generating the identity file, the device owner uploads the identity file to the access control node, to indicate the access control node to store the identity file to the IPFS.

The access control node may perform authentication on an identity of the device owner, which may be completed based on the identity certificate and the signature that are provided by the device owner. The identity certificate may include a public key. The public key and the device owner public key may be generally the same, or may be two public keys generated based on a certificate chain. The access control node may perform verification based on the public key of the device owner and the signature carried in the identity file. For example, if the public key of the device owner is the same as the public key stored in the identity file, a common signature verification step is used, for example, RSA. The public key and the signature in the file are used to perform an operation, and then a value (namely, a hash value) is obtained. In addition, a hash operation is performed on file data to obtain a hash value of the file, and then the two hash values are compared. If the two hash values are the same, verification on the signature succeeds. Otherwise, verification on the signature fails.

708: The access control node verifies integrity of the signature of the identity file.

The identity file carries the signature. The identity file may be verified based on the signature and the public key of the device owner, to determine whether the identity file is tampered with. If the identity file is complete, subsequent steps may be performed. If the identity file is incomplete, the identity file is discarded, or the device owner is notified to resend the identity file, or a communication failure response is returned.

For example, when generating the identity file, the device owner may generate the signature of the identity file based on the private key of the device owner and according to an encryption algorithm. After receiving the identity file, the access control node performs a signature verification operation on the identity file based on the public key and the signature of the device owner, to verify whether the identity file is complete.

709: The access control node sends an ownership query request to the database.

The ownership query request may carry the public key of the device, or may carry the hash value of the public key, to request the association information of the device from the database.

710: The database feeds back the association information of the device to the access control node.

After receiving the ownership query request sent by the access control node, the database may query locally stored data based on the public key carried in the ownership query request, extract the association information of the device, and feed back the association information of the device to the access control node.

The association information may include the information about the device and the information about the owner associated with the device. The association information may specifically include the public key of the device, or the hash value of the public key of the device, the public key of the owner, the hash value of the public key of the owner, or the like.

711: The access control node verifies consistency between the identity of the device owner and an identity of an identity file uploader.

After receiving the association information of the device, the access control node may verify whether the identity of the owner of the device is consistent with the identity of the uploader of the identity file. If the public key of the owner in the association information is consistent with the public key of the device owner, the device belongs to the identity file uploader, that is, the device is associated with the identity file uploader, and subsequent steps can be performed. If the public key of the owner in the association information and the public key of the device owner are inconsistent, the device does not belong to the identity file uploader. In this case, the identity file may be discarded, or the device owner may be notified to resend the identity file, or a communication failure response is returned.

712: The access control node sends the identity file of the device to the IPFS.

After the access control node verifies that the device is associated with the device owner, that is, the device owner has permission to upload the identity file of the device, the access control node may send the identity file to the IPFS, to store the identity file in the IPFS.

713: The IPFS sends the hash value of the identity file to the access control node.

After receiving and storing the identity file of the device sent by the access control node, the IPFS may generate a hash value (namely, a first identifier) corresponding to the identity file and feed back the hash value to the access control node. The hash value may be used to read the identity file of the device stored in the IPFS. For example, after receiving the hash value, the IPFS may calculate a storage address of the file based on the hash value and through a corresponding parsing operation, to read the identity file of the device based on the address.

Specifically, a specific manner of generating the hash value may be obtained according to a hash (Hash) algorithm, for example, algorithms such as MD4, MD5, or SHA. For example, content or the storage address of the identity file can be used as an input of the algorithm to output the corresponding hash value.

For example, a manner of generating the hash value according to the MD5 algorithm may include: MD5 ("a file name+data content"). For example, MD5 ("/sdcard/youku/offlinedata/test.txt&showdemotesttxt") =f96b697d7cb7938d525a2f3laaf16 1d0 (namely, the hash value).

714: The access control node feeds back the hash value of the identity file to the device owner.

After receiving the hash value fed back by the IPFS, the access control node may feed back the hash value to the device.

715: The device owner sends the hash value of the identity file to the blockchain.

After receiving the hash value sent by the access control node, the device owner may send the hash value to the blockchain, so that the blockchain writes the hash value into a block according to the smart contract.

In addition, the device owner may further send the information about the device or the information about the device owner to the blockchain, to indicate an identity of the device owner, so that the blockchain can identify a source of the hash value and determine ownership of the hash value.

716: The blockchain writes the hash value of the identity file into the block according to the smart contract.

After receiving the hash value sent by the device owner, the blockchain may write the hash value into the block according to the smart contract, and may further identify the information about the device corresponding to the identity file indicated by the hash value, the information about the device owner, or the like.

717: The blockchain feeds back the transaction number, the block number, or the like to the device owner.

After writing the hash value of the identity file of the device into the block, the blockchain may feed back the transaction number, the block number, or the like to the device owner, to notify the device owner that the hash value is stored in the block.

718: The database scans the block transaction information.

The step 718 is similar to the step 704.

719: The database updates the association information of the device.

The hash value of the identity file is added to the transaction information of the scanned block, so that the hash value can be updated to the association information of the device, the association information of the device is more complete, and another device can obtain a storage identifier of the identity file from the association information stored in the database.

Therefore, in this implementation, the device owner may register the device with the blockchain, so that the blockchain writes the information about the device and the owner of the device into the block according to the matched smart contract. The database can obtain the association information of the first device from data stored in the blockchain. The association information includes the information about the device associated with the first device, which is equivalent to that the first device has been registered with a blockchain service provider. After receiving the identity file of the first device, the first access control node may request the association information of the first device from the database node and perform verification. After verification succeeds, the identity file of the first device may be stored in the file system, and sends the first identifier fed back by the file system to the second device, so that the second device or another device can use the first identifier to read the identity file from the file system. Therefore, in the device management method provided in this disclosure, the access control node can be used to perform access control on a device that accesses the system or an ownership device, verify permission of the device that accesses the system, and allow the device to perform further processing, such as data storage or data reading, only when the device has the permission to access the system, thereby improving privacy and security of data transmission in the system.

2. Identity Query

The identity query may be classified into a plurality of cases. The identity file may be queried by the device itself, or the identity file may be queried by the device owner. For example, when the device owner needs to modify the identity file of the device, the device owner may request the identity file stored on the device management platform from the access control node. Alternatively, when the device owner does not locally store the identity file of the device or local data is lost, the device owner may request the identity file of the device from the access control node. For another example, when the device accesses a network for the first time, the device may request, over a default network to the access control node, to query the identity file. The identity file may include the identity information of the first device and the identity information of the second device associated with the first device, and may further include information about an operator that provides the network, so that the device can subsequently access, based on the identity file, the network provided by the operator.

The following separately describes an example of a scenario in which a device requests to query an identity file and an example of a scenario in which a device owner requests to query an identity file.

1. The Device Owner Queries the Identity File.

Figure 8:
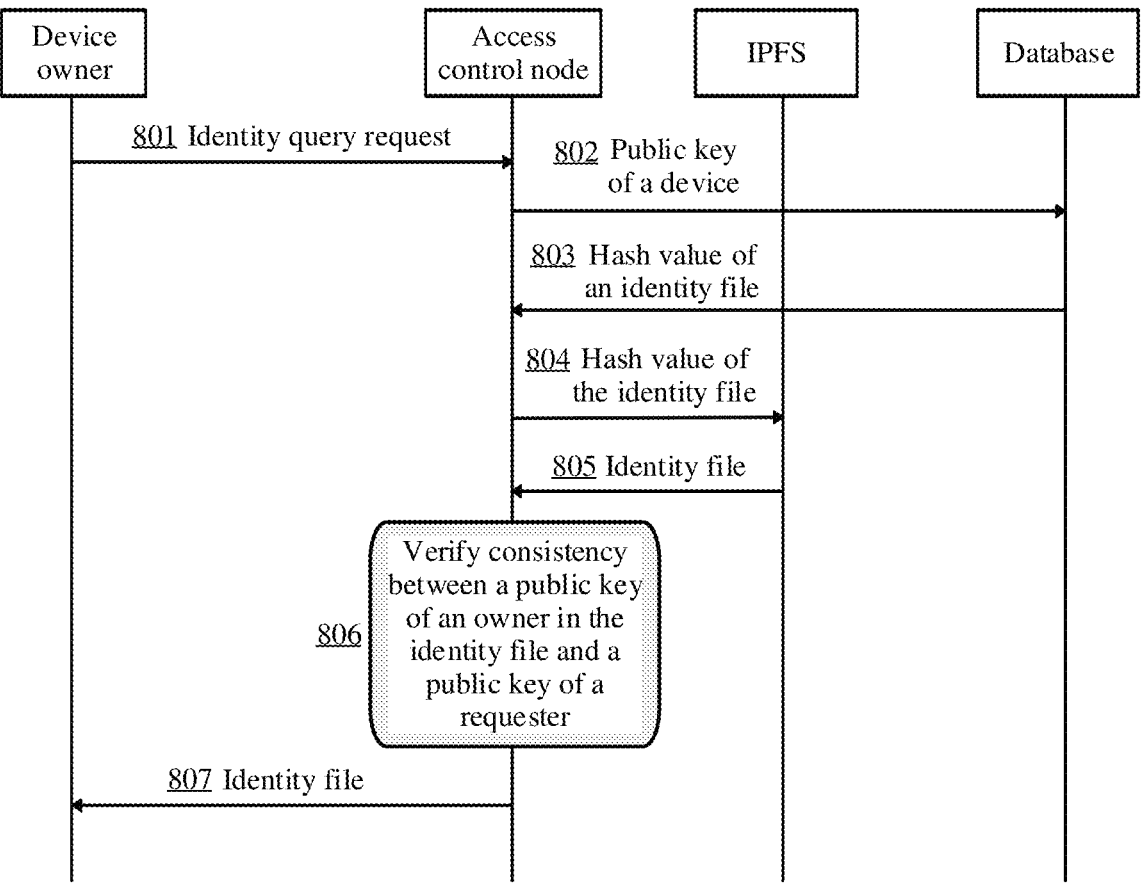
FIG. 8 is a schematic flowchart of still another example device management method according to an embodiment of this disclosure.

FIG. 8 is a schematic flowchart of another example device management method according to an embodiment of this disclosure.

801: A device owner sends an identity query request to an access control node.

The identity query request may carry information about a device, information about the device owner, or the like, to request the access control node to query an identity file of the device.

For the information about the device and the information about the owner of the device, refer to related descriptions in the step 701.

802: The access control node sends a public key of the device to a database.

After receiving the identity query request from the device owner, the access control node may request a hash value of the identity file from the database. Specifically, a first request message may be sent to the database. The first request message may carry the public key of the device, to request the hash value of the identity file of the device from the database.

Certainly, the first request message may further carry the information about the device owner, such as a public key, a sequence number, or an identifier of the device owner, so that the database identifies the device owner and reads association information of the device owned by the device owner. Therefore, in this implementation, the access control node may request the first identifier from the database node, so that the identity file can be read from the file system based on the first identifier.

803: The database feeds back the hash value of the identity file to the access control node.

After receiving the first request message, the database may query, based on the device public key carried in the first request message, stored data for association information corresponding to the public key, to extract the hash value of the identity file from the association information, or directly feed back the association information to the access control node.

804: The access control node sends the hash value of the identity file to an IPFS.

After receiving the hash value of the identity file, the access control node may send the hash value to the IPFS, to request the identity file corresponding to the hash value from the IPFS.

805: The IPFS delivers the identity file to the access control node.

After receiving the hash value sent by the access control node, the IPFS may determine an address corresponding to the hash value, read the identity file of the device from the address, and deliver the identity file to the access control node.

For example, a specific manner of determining the address corresponding to the hash value may include: querying, based on a pre-configured mapping relationship, the address corresponding to the hash value, or calculating, through an inverse operation of hash value generation, the address at which the identity file is stored, to extract the identity file of the device.

806: The access control node verifies consistency between the public key of the owner in the identity file and a public key of a requester.

The access control node may further verify whether the device owner has permission to query the identity file of the device, that is, determine whether information about a user associated with the device contained in the identity file matches information about the requester.

For example, it may be determined whether the public key of the owner of the device included in the identity file is consistent with a public key of the requester. If they are consistent, the identifier requester is the owner of the device, and the requester has permission to query the identity file of the device. If the public key of the owner of the device included in the identity file is inconsistent with the public key of the requester, it indicates that the requester may not have the permission to query the identity file of the device. In this case, the identity file does not need to be fed back to the requester, or a message indicating that the requester does not have the query permission or a communication failure is returned.

807: The access control node feeds back the identity file to the device owner.

After the access control node verifies that the device is associated with the device owner, the access control node may deliver the identity file to the device owner, so that the device owner can obtain the identity file of the device.

Therefore, in this implementation, the device owner may request, by using the access control node, to query the identity file of the device, and the access control node may verify the permission of the requester. The identity file of the device is fed back to the requester only when the requester has the permission to query the identity file of the device, thereby improving data security and privacy of the device.

2. The Device Itself Queries the Identity File.

In a scenario in which the device queries the identity file, the device may directly communicate with the access control node, or may communicate with the access control node by using a registration server. The following separately describes different scenarios by using examples.

(1) The Device Directly Communicates with the Access Control Node.

Figure 9:
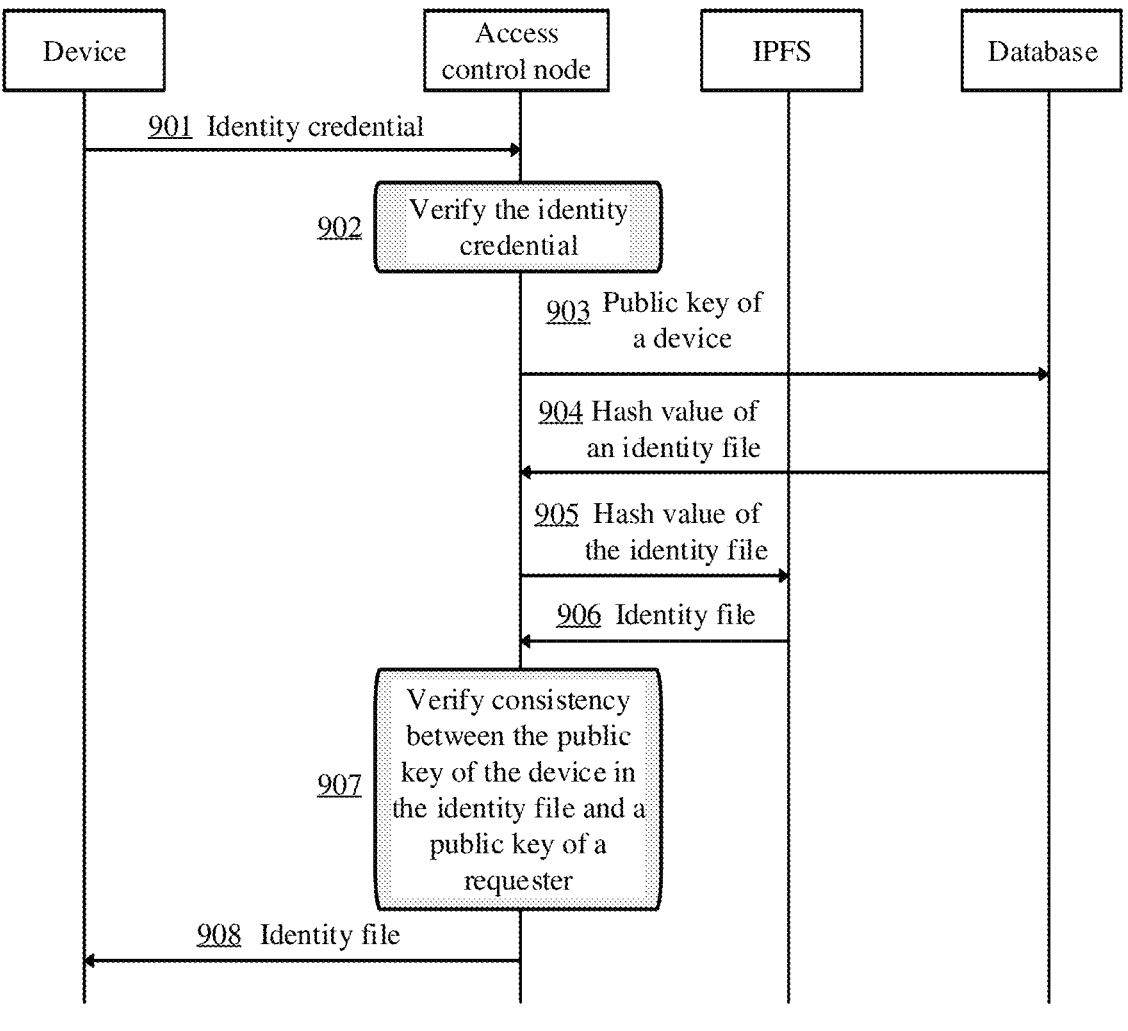
FIG. 9 is a schematic flowchart of yet another example device management method according to an embodiment of this disclosure.

FIG. 9 is a schematic flowchart of still another example device management method according to an embodiment of this disclosure.

901: A device sends an identity credential to an access control node.

The identity credential of the device may include information about the device, to request an identity file of the device from the access control node, for example, a public key of the device, a hash value of the public key, a sequence number, a unique identifier, a time stamp, a random value, and a signature generated based on a private key.

For example, the device may obtain a domain name or an address of the access control node from a memory, and then initiate a link to the access control node based on the domain name or the address, and upload the identity credential of the device, including a certificate, the time stamp, the random value, the signature generated based on the private key, and the like of the device. The time stamp may be used to prevent a replay attack and improve data transmission security in a system.

902: The access control node verifies the identity credential.

After receiving the identity credential uploaded by the device, the access control node may verify the identity credential. After verification succeeds, perform the following steps. If verification fails, no subsequent step needs to be performed, or a message, for example, a message indicating to resend the identity credential or a communication failure, may be fed back to the device.

If the identity credential includes the time stamp, verification may be performed on whether a message including the time stamp has been received. If yes, the identity credential may be discarded. If no, verification may continue to be performed on a signature based on the public key of the device. If verification succeeds, subsequent steps may be performed.

903: The access control node sends the public key of the device to the database.

904: The database feeds back the hash value of the identity file to the access control node.

905: The access control node sends the hash value of the identity file to an IPFS.

906: The IPFS delivers the identity file to the access control node.

For the step 903 to the step 906, refer to the step 802 to the step 805.

907: The access control node verifies consistency between the public key of the device in the identity file and a public key of a requester.

After obtaining the identity file of the device, the access control node may verify whether device information included in the identity file matches information about the requester, for example, verify whether the public key of the device in the identity file is consistent with the public key of the requester. If the public key of the device in the identity file is consistent with the public key of the requester, the access control node continues to perform subsequent steps. If the public key of the device is inconsistent with the public key of the requester, the access control node may feed back a message of a communication failure or no permission to the requester without performing the subsequent steps.

908: The access control node feeds back the identity file to the device.

After the access control node determines that the public key of the device in the identity file is consistent with the public key of the requester, it indicates that the identity file is requested by a device to which the identity file belongs, and the device has permission to query the identity file, and the identity file may be fed back to the device.

Therefore, in this implementation, the device may request, by using the access control node, to query the identity file of the device, and the access control node may verify the permission of the requester. The identity file of the device is fed back to the requester only when the requester has the permission to query the identity file of the device, thereby improving data security and privacy of the device.

Figure 10A:
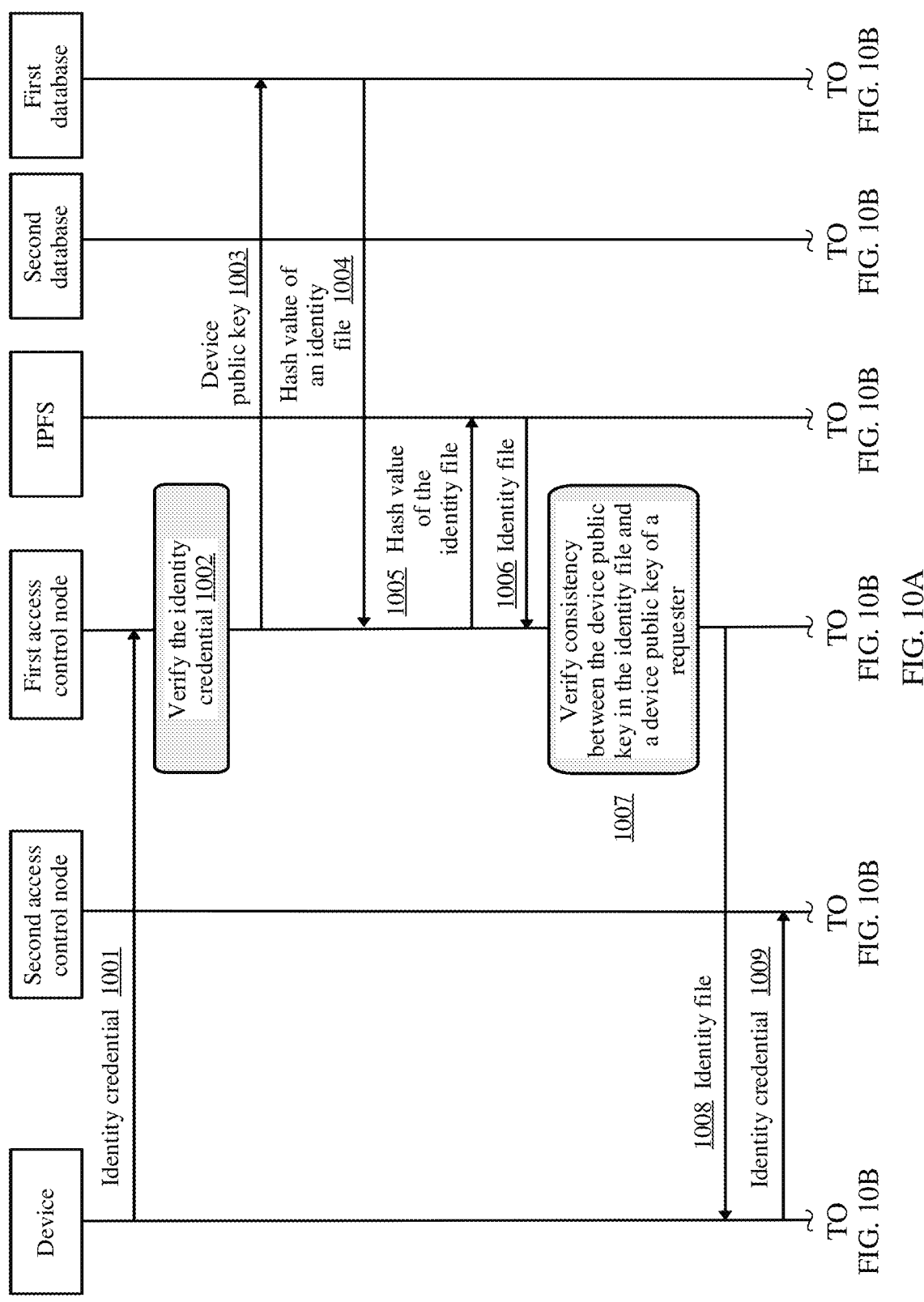
FIG. 10A and FIG. 10B are a schematic flowchart of still yet another device management method according to an embodiment of this disclosure.
Figure 10B:
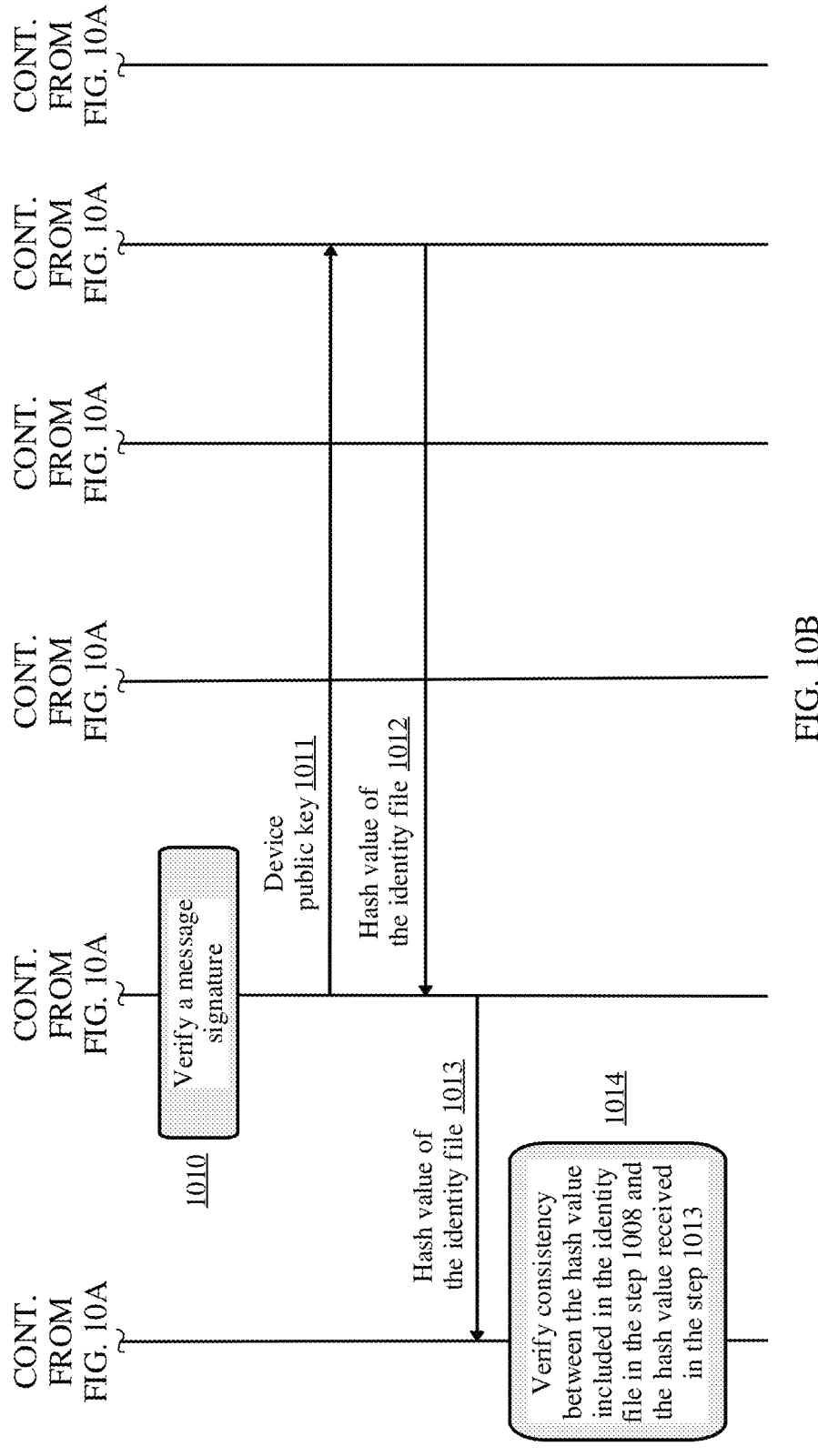

In addition, to further improve reliability of the obtained identity file, the hash value of the identity file of the device may be obtained from a plurality of databases by using a plurality of access control nodes, to compare whether hash values of the identity file fed back by the plurality of access control nodes are consistent. If the hash values are consistent, the querier may store the identity file. FIG. 10A and FIG. 10B are a schematic flowchart of yet another example device management method according to an embodiment of this disclosure.

1001: A device sends an identity credential to a first access control node.

1002: The first access control node verifies the identity credential.

1003: The first access control node sends a device public key to a first database.

1004: The first database feeds back a hash value of an identity file to the first access control node.

1005: The first access control node sends the hash value of the identity file to an IPFS.

1006: The IPFS delivers the identity file to the first access control node.

1007: The first access control node verifies consistency between the device public key in the identity file and a device public key of a requester.

1008: The first access control node feeds back the identity file to the device.

For the step 1001 to the step 1008, refer to the descriptions of the step 901 to the step 908.

1009. The device sends the identity credential to a second access control node.

Step 1010 is similar to the step 1001. A difference lies in that in the step 1001, the device sends the identity credential to the first access control node to request the identity file of the device, while in the step 1010, the device sends the identity credential to the second access control node to request the hash value of the identity file of the device. Certainly, in the step 1010, the device may alternatively request the identity file of the device from the second access control node. Adjustment may be performed according to an actual application scenario. This embodiment is merely an example for description.

1010: The second access control node verifies a message signature.

1011: The second access control node sends the device public key to a second database.

1012: The second database feeds back the hash value of the identity file to the second access control node.

1013: An access control server sends the hash value of the identity file to the device.

For the step 1010 to the step 1013, refer to the step 902 to the step 904. A difference lies in that the requested databases are different.

1014: The device verifies consistency between the hash value included in the identity file in the step 1008 and the hash value received in the step 1013.

After receiving the identity file fed back by the first access control node and the hash value of the identity file fed back by the second access control node, the device verifies whether the hash value included in the identity file fed back by the first access control node is consistent with the hash value fed back by the second access control node. If yes, the identity file may be stored. If no, the identity file may be discarded, and the step 1001 to the step 1013 are performed again until an accurate identity file is obtained.

Therefore, in this implementation, whether identifiers of the identity file fed back by a plurality of access control nodes are consistent may be compared. The device stores the identity file only when the identifiers of the identity file fed back by the plurality of access control nodes are consistent, so that the device can obtain a more accurate identity file.

(2) The Device Communicates with the Access Control Node Through a Registration Server.

The device may be connected to the registration server, and communicate with the device management platform by using the registration server. The registration server may be a server configured for the device, and is configured to communicate with the device, to reduce load of the access control server. The registration server may also be a node in a network accessed by the device. For example, the device may access a Wi-Fi network, and the registration server may be one of network management systems in the Wi-Fi network.

Figure 11:
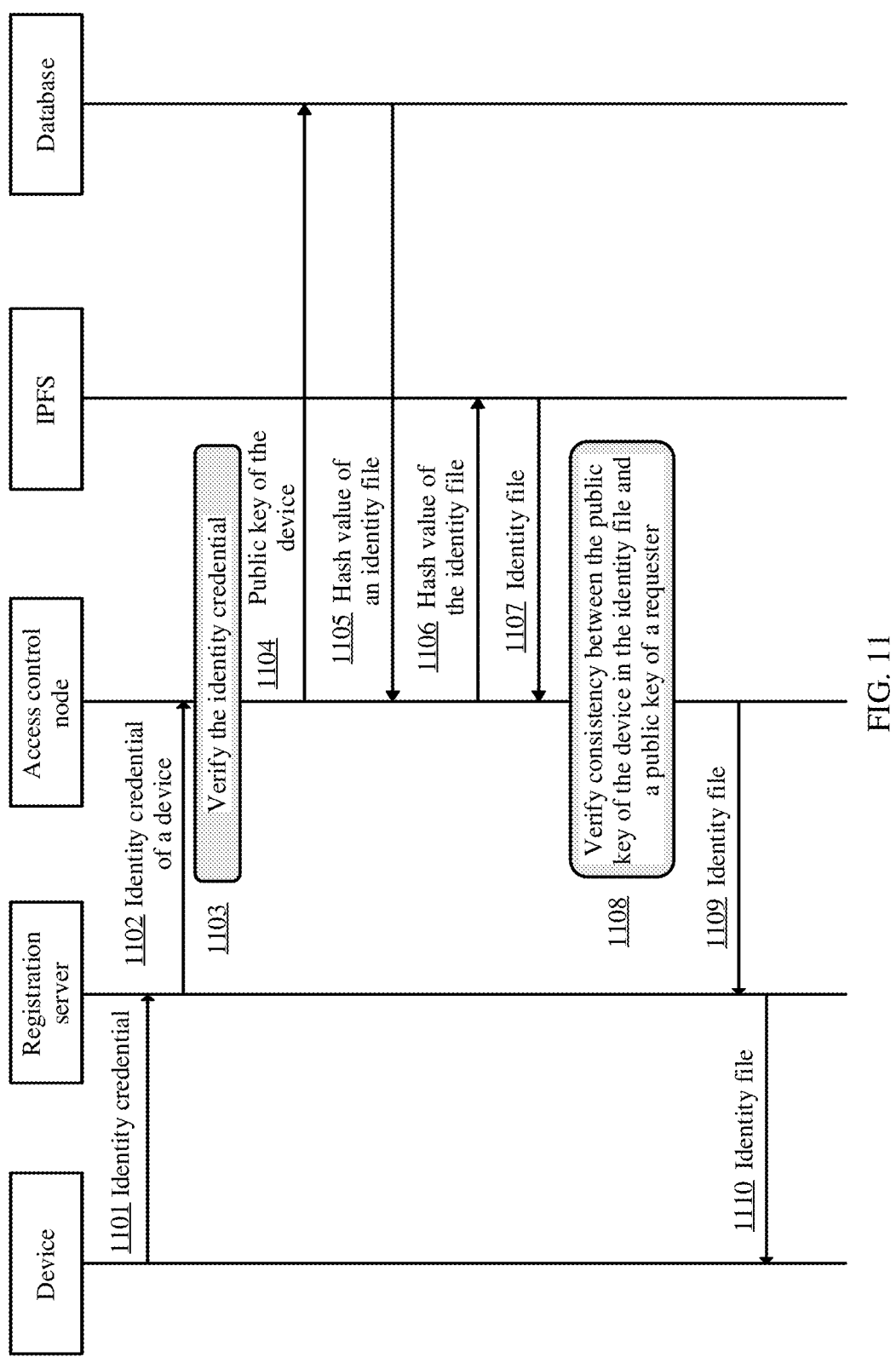
FIG. 11 is a schematic flowchart of a further example device management method according to an embodiment of this disclosure.

FIG. 11 is a schematic flowchart of still yet another example device management method according to an embodiment of this disclosure.

1101: A device sends an identity credential to a registration server.

The device may send the identity credential to the registration server, to request an identity file of the device from the registration server.

Before the step 1101, an encrypted channel, for example, a Transport Layer Security (TLS) encrypted channel or a channel encrypted in another encryption manner, may be established between the device and the registration server, thereby improving security of data transmitted between the device and the registration server.

1102: The registration server forwards the identity credential of the device to an access control node.

The registration server may forward the identity credential sent by the device to the access control node through an encrypted channel.

Before the step 1102, the encrypted channel is also established between the registration server and the access control node. An encryption manner of the encrypted channel may be the same as or different from an encryption manner of the encrypted channel between the device and the registration server. The encryption manner may be adjusted based on an actual application scenario.

It should be noted that a difference between the step 1101 to the step 1102 and the step 901 lies in that, in the step 901, the device may directly send the identity credential to the access control node, and in the step 1101 to the step 1102, the identity credential needs to be forwarded by the registration server.

1103: The access control node verifies the identity credential.

1104: The access control node sends a public key of the device to a database.

1105: The database feeds back a hash value of the identity file to the access control node.

1106: The access control node sends the hash value of the identity file to an IPFS.

1107: The IPFS delivers the identity file to the access control node.

1108: The access control node verifies consistency between the public key of the device in the identity file and a public key of a requester.

For the step 1103 to the step 1108, refer to the step 902 to the step 907.

1108: The access control node sends the identity file to the registration server.

1109: The registration server forwards the identity file to the device.

The access control node may feed back the identity file to the registration server through the encrypted channel between the access control node and the registration server, and the registration server may forward the identity file to the device through the encrypted channel between the registration server and the device. Certainly, the identity file may be transmitted not through encrypted channel. This may be specifically adjusted based on an actual application scenario.

It should be noted that the step 1108 to the step 1109 are similar to the step 908. A difference lies in that, in the step 908, the access control node directly sends the identity file to the device, but in the step 1108 to the step 1109, the registration server forwards the identity file.

Therefore, in this implementation, data transmitted between the device and the access control node may be forwarded by using the registration server, and may be transmitted through the encrypted channels, so that security of the data transmitted between the device and the access control node can be improved.

3. Device Transfer

The device owner may transfer the device to another user. In this disclosure, an example in which a manufacturer (that is, a first device owner) transfers the device to a user (that is, a second device owner) is used for description. Steps similar to those in FIG. 8 to FIG. 11 are not described in detail. The following describes only differences by using examples.

Figure 12A:
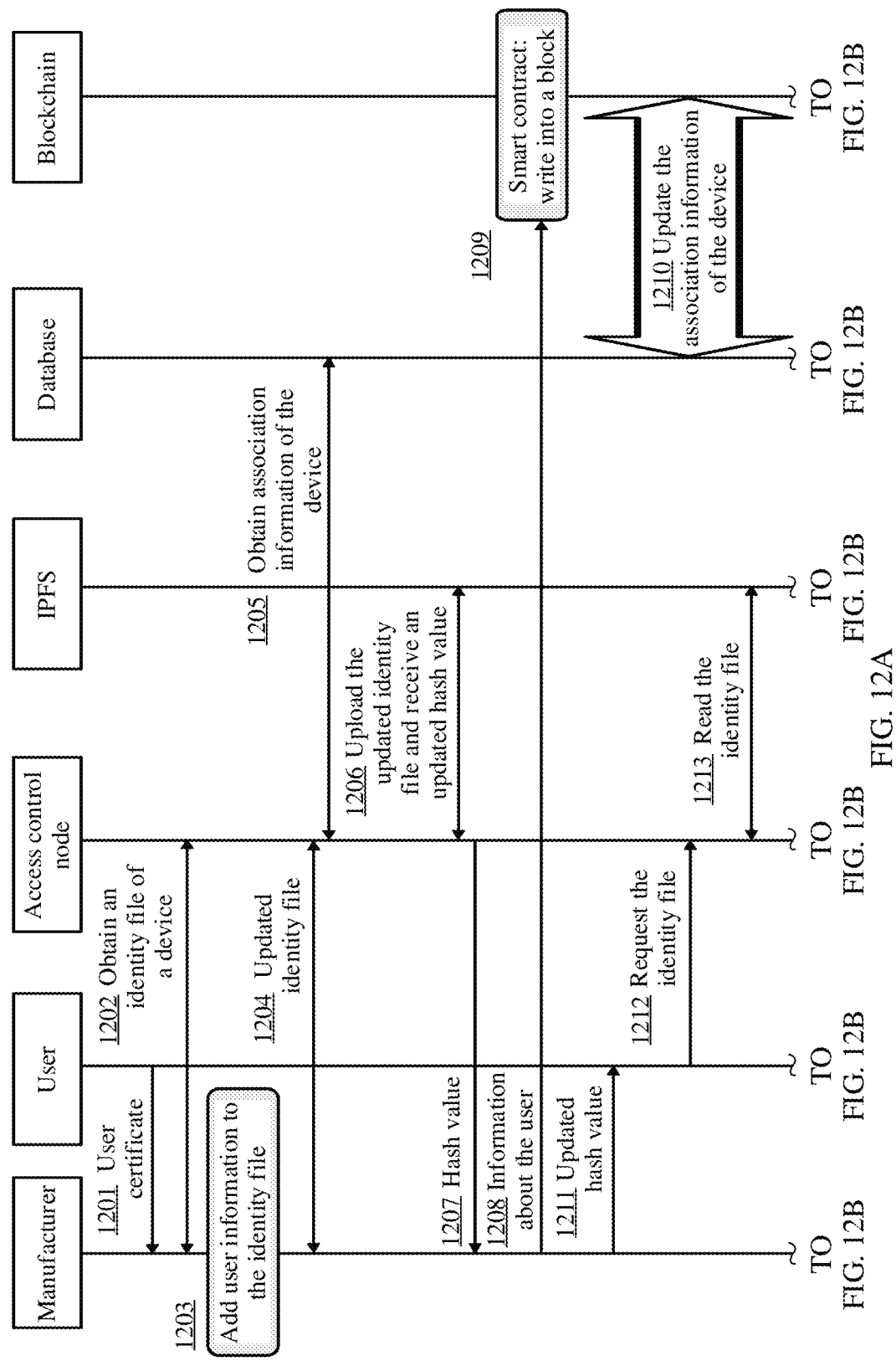
FIG. 12A and FIG. 12B are a schematic flowchart of a still further example device management method according to an embodiment of this disclosure.
Figure 12B:
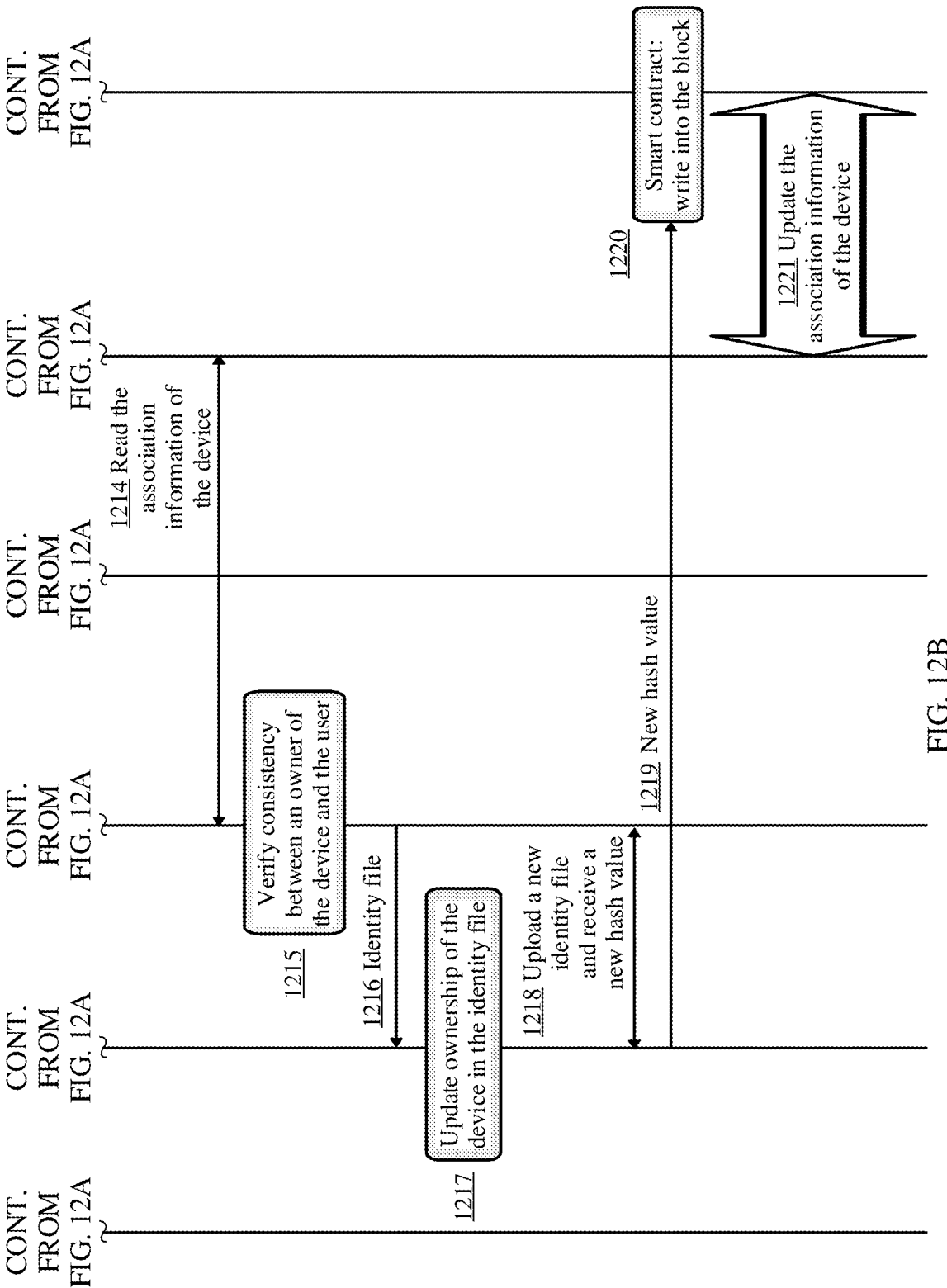

FIG. 12A and FIG. 12B are a schematic flowchart of a further example device management method according to an embodiment of this disclosure.

1201: A user sends its own user certificate to a manufacturer.

After the user and the manufacturer agree to transfer a device, the user may provide an identity certificate of the user to the manufacturer. For ease of distinguishing, the identity certificate is referred to as the user certificate. The user certificate may include information about the user, such as a public key of the user, a user name, or a user identifier.

1202: The manufacturer obtains an identity file of the device from the access control node.

The manufacturer may obtain the identity file of the device from the access control node. For a specific process, refer to the steps in FIG. 8.

1203: The manufacturer adds the user information to the identity file.

After obtaining the identity file, the manufacturer can add the information about the user to the identity file of the device.

For example, the identity file of the device may be shown in Table 1. The manufacturer may add the certificate of the user to the "information about next ownership" in the identity file. The certificate includes the public key of the user, to obtain an updated identity file, to indicate that the device is transferred to the next ownership, that is, the user.

In addition, the public key of the user can be used for symmetric encryption and the updated identity file can be signed so that the user can use the public key to decrypt or verify the identity file.

1204: The manufacturer sends the updated identity file to the access control node.

1205: The access control node obtains association information of the device from a database.

1206: The access control node uploads the updated identity file to an IPFS and receives an updated hash value.

1207: The access control node delivers the updated hash value to the manufacturer.

The step 1204 to the step 1207 are similar to the step 707 to the step 713, and a difference lies in that the identity file updated by the manufacturer is uploaded herein, while the identity file generated by the device owner is uploaded in the step 707 to the step 713.

1208: The manufacturer sends the information about the user to a blockchain.

The information about the user may include information such as the public key, the name, or another identifier of the user. In addition, the manufacturer may further send a public key of the device, the updated hash value, and the like to the blockchain, to indicate the blockchain to update transaction information of the device.

1209: The blockchain writes the information about the user into a block according to a smart contract.

The blockchain may write the information about the user into the block according to the smart contract. For example, the user is considered as a next owner of the device, and is identified in the transaction information.

1210: The database updates the association information of the device.

Refer to the step 704, the database may scan transaction information of the blockchain, to update device-related information included in the transaction information to the association information of the device, to obtain updated association information.

1211: The manufacturer sends the updated hash value to the user.

In addition, the manufacturer further sends the updated hash value (namely, a third identifier) to the user, so that the user can read the identity file of the device based on the third identifier.

1212: The user uses the updated hash value to request the identity file from the access control node.

The user may send a request message to a control server. The request message carries the updated hash value, to request the access control node to read the identity file of the device. The request message may further carry the information about the user, such as the public key, the name, or another identifier of the user.

1213: The access control node reads the identity file from the IPFS.

1214: The access control node reads the association information of the device from the database.

For the step 1213 to the step 1214, refer to the step 804 to the step 805.

1215: The access control node verifies consistency between the owner of the device and the user.

In the step 1203 to the step 1209, the ownership of the device in the association information of the device in the database is changed to the user. Therefore, the owner of the device is replaced with the user. In this case, it may be verified whether information about the owner included in the association information matches the information about the user. For example, it is determined whether the public key of the next owner included in the association information is consistent with the public key of the user. If the public keys are consistent, it indicates that the owner of the device is the user. In this case, the subsequent steps may continue to be performed. If the public keys are inconsistent, the device does not belong to the user. In this case, the subsequent steps do not need to be performed.

1216: The access control node delivers the identity file to the user.

If the access control node determines that the device belongs to the user, the access control node may deliver, to the user, the identity file of the device delivered by the IPFS, so that the user obtains the identity file of the device owned by the user.

1217: The user updates the ownership of the device in the identity file.

After obtaining the identity file, the user can change the ownership of the device in the identity file to the information about the user.

For example, refer to Table 1. Information included in the device ownership information may be replaced with the information about the user, for example, replaced with the name or the identity certificate of the user.

1218: The user uploads a new identity file to the access control node and receives a new hash value.

1219: The user uploads the new hash value to the blockchain.

1220: The blockchain writes the new hash value into the block according to the smart contract.

1221: The database updates the new hash value to the association information of the device.

The step 1218 to the step 1221 are similar to the step 1103 to the step 1109, and a difference lies in that the identity file is uploaded by the user instead of the manufacturer.

Therefore, in this implementation, the device may be transferred, that is, the device is transferred from a current owner to a next owner. Therefore, it can adapt to more scenarios, including device registration, transfer, and information query, and a generalization capability is strong.

The foregoing describes in detail the systems and the methods provided in this disclosure, and the following describes apparatuses provided in this disclosure.

Figure 13:
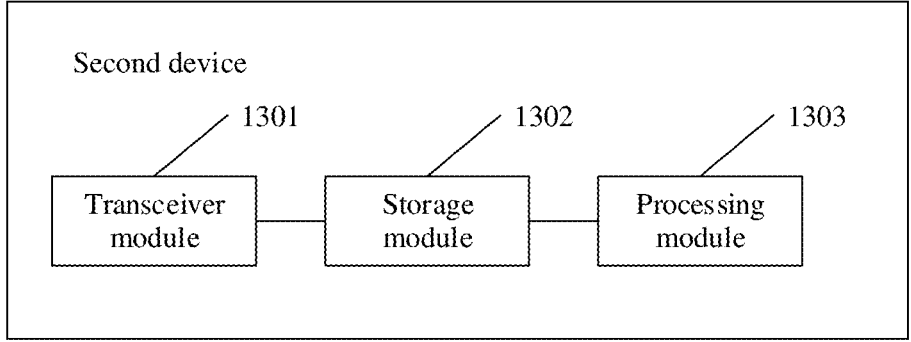
FIG. 13 is a schematic diagram of a structure of an example second device according to an embodiment of this disclosure.

FIG. 13 is a schematic diagram of a structure of an example second device according to an embodiment of this disclosure.

The second device includes:

a transceiver module 1301, configured to send an identity file to a first access control node, to indicate the first access control node to store the identity file in a file system, where the identity file includes identity information of a first device and a public key of a second device; and the transceiver module 1301 is further configured to receive a first identifier sent by the first access control node, where the first identifier is used to read the identity file from the file system, the first identifier is generated by the file system after the first access control node sends the identity file to the file system, the identity file is sent by the first access control node to the file system after verification is performed on the second device and information about a device associated with the first device in association information and succeeds, the association information is requested and obtained by the first access control node from the blockchain node, and the association information is stored in the database node.

In a possible implementation, the transceiver module 1301 is further configured to: before the second device sends the identity file to the first access control node, send registration information to the blockchain node, where the registration information includes information about the first device and a public key of the second device, the registration information indicates the blockchain node to store the information about the first device and the public key of the second device in transaction information of the first device according to a smart contract corresponding to the first device, and the transaction information is used by the database node to generate the association information of the first device.

In a possible implementation, the transceiver module 1301 is further configured to send the first identifier to the blockchain node, to indicate the blockchain node to update the first identifier to the transaction information of the first device.

In a possible implementation, the transceiver module 1301 is further configured to: send the first identifier to the first access control node, and receive the identity file sent by the first access control node, where the identity file is requested and obtained by the first access control node from the file system based on the first identifier.

In a possible implementation, the device management system further includes a second access control node, and the second device further includes a storage module 1302.

The transceiver module 1301 is further configured to send a third request message to the second access control node.

The transceiver module 1301 is further configured to receive a second identifier sent by the second access control node.

The storage module 1302 is configured to store the identity file if the second identifier matches the first identifier.

In a possible implementation, the second device may further include a processing module 1303.

The transceiver module 1301 is further configured to receive information about a third device, where the information about the third device includes a public key of the third device.

The processing module 1303 is configured to add the public key of the third device to the identity file, to obtain an updated identity file.

The transceiver module 1301 is further configured to send the updated identity file to the first access control node, to indicate the first access control node to send the updated identity file to the file system and receive a third identifier fed back by the file system.

The transceiver module 1301 is further configured to receive the third identifier sent by the first access control node, where the third identifier is used to request the updated identity file from the file system.

Figure 14:
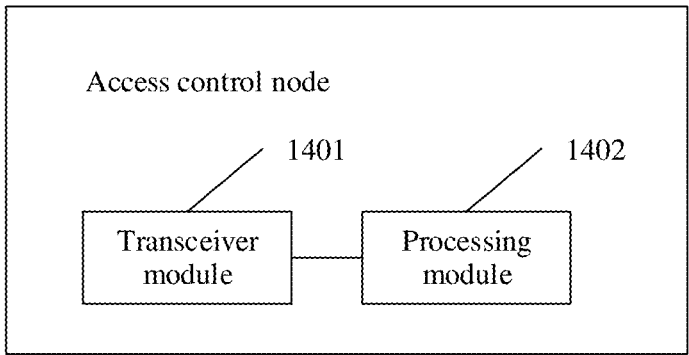
FIG. 14 is a schematic diagram of a structure of an example access control node according to an embodiment of this disclosure.

FIG. 14 is a schematic diagram of a structure of an example access control node according to an embodiment of this disclosure.

A transceiver module 1401 is configured to receive an identity file sent by a second device, where the identity file includes a public key of a first device and a public key of the second device.

The transceiver module 1401 is further configured to request association information of the first device from a database node based on the identity file, the association information includes a public key of an owner of the first device, and the association information is obtained by the database node from the blockchain node.

A processing module 1402 is configured to determine, based on the association information, that the first device is associated with the second device.

If the processing module 1402 determines, based on the association information, that the first device is associated with the second device, the transceiver module 1401 is further configured to send a request to a file system to send the identity file, to indicate the file system to store the identity file.

The transceiver module 1401 is further configured to: receive a first identifier fed back by the file system, and send the first identifier to the second device, where the first identifier is used to read the identity file from the file system.

In a possible implementation, the transceiver module 1401 is further configured to: if the processing module 1402 determines, based on a signature carried in the identity file, that the identity file is complete, request the association information of the first device from the database node based on the identity file.

In a possible implementation, the transceiver module 1401 is further configured to receive an identity request message sent by the second device, where the identity request message carries information about the first device and the public key of the second device, and the identity request message is used to request the identity file;

the transceiver module 1401 is further configured to send a first request message to the database node, where the first request message includes the information about the first device;

the transceiver module 1401 is further configured to receive the first identifier sent by the database node;

the transceiver module 1401 is further configured to: send the first identifier to the file system, and receive the identity file fed back by the file system; and if a public key included in the identity file matches the public key of the second device, the transceiver module 1401 is further configured to send the identity file to the second device.

In a possible implementation, the transceiver module 1401 is further configured to receive an identity credential sent by the first device, where the identity credential includes an identifier of the first device.

The processing module 1402 is further configured to perform verification on the identity credential.

If verification on the identity credential succeeds, the transceiver module 1401 is further configured to send a second request message to the database node, where the second request message includes the identifier of the first device.

The transceiver module 1401 is further configured to receive the first identifier sent by the database node.

The transceiver module 1401 is further configured to: send the first identifier to the file system, and receive the identity file fed back by the file system.

If the public key included in the identity file matches the public key of the first device, the transceiver module 1401 is further configured to send the identity file to the first device.

In a possible implementation, the device management system further includes a registration server.

The transceiver module 1401 is specifically configured to receive the identity credential forwarded by the registration server, where the identity credential is sent by the first device to the registration server through an encrypted pipeline between the first device and the registration server.

The transceiver module 1401 is specifically configured to send the identity file to the first device.

The transceiver module 1401 is specifically configured to send the identity file to the first device by using the registration server.

In a possible implementation, the transceiver module 1401 is further configured to: receive an updated identity file sent by the second device, send the updated identity file to the file system, receive a third identifier fed back by the file system, and send the third identifier to the second device, where the third identifier is used to request the updated identity file.

Figure 15:
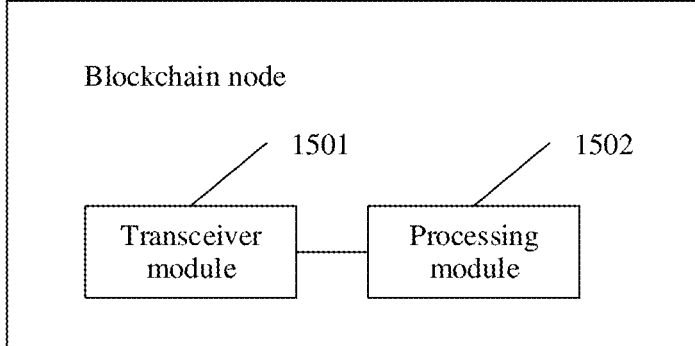
FIG. 15 is a schematic diagram of a structure of an example blockchain node according to an embodiment of this disclosure.

FIG. 15 is a schematic diagram of a structure of an example blockchain node according to an embodiment of this disclosure, including:

a transceiver module 1501, configured to receive registration information sent by a second device, where the registration information includes a public key of a first device and a public key of the second device; and a processing module 1502, configured to write the public key of the first device and the public key of the second device into transaction information in a blockchain according to a smart contract corresponding to the first device, so that after obtaining transaction information of the blockchain node, the database node stores, in association information of the first device, the public key of the first device and the public key of the second device that are included in the transaction information. The association information includes information about a device associated with the first device.

In a possible implementation, the transceiver module 1501 is further configured to receive a first identifier. The first identifier is used to request an identity file of the first device, and the first identifier is generated by the file system after the file system stores the identity file.

The processing module 1502 is further configured to write the first identifier into transaction information of the first device according to the smart contract corresponding to the first device, so that after obtaining the transaction information of the blockchain node, the database node stores the first identifier in the association information.

Figure 16:
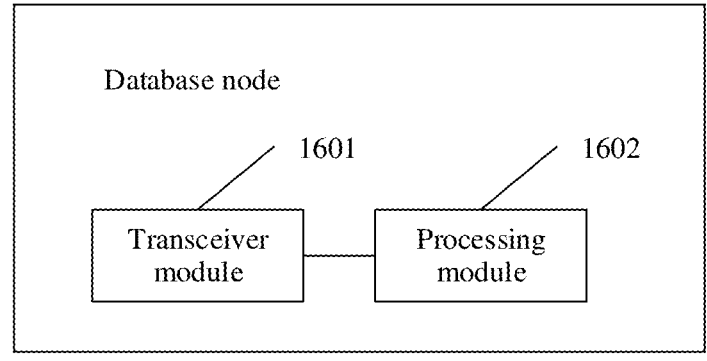
FIG. 16 is a schematic diagram of a structure of an example database node according to an embodiment of this disclosure.

FIG. 16 is a schematic diagram of a structure of an example database node according to an embodiment of this disclosure, including:

a transceiver module 1601, configured to obtain transaction information in a blockchain of the blockchain node; and a processing module 1602, configured to store, in association information of a first device, a public key of the first device and a public key of a second device that are included in the transaction information, where the association information includes information about a device associated with the first device.

In a possible implementation, the transceiver module 1601 is further configured to receive an ownership request message sent by a first access control node, where the ownership request message carries the public key of the first device.

The transceiver module 1601 is further configured to send the association information of the first device to the first access control node according to the public key of the first device.

Figure 17:
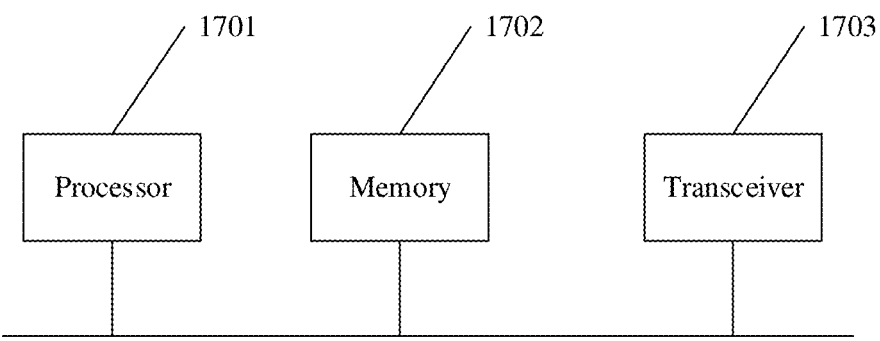
FIG. 17 is a schematic diagram of a structure of another example second device according to an embodiment of this disclosure.

FIG. 17 is a schematic diagram of a structure of another example second device according to an embodiment of this disclosure. Details are as follows.

The second device may include a processor 1701 and a memory 1702. The processor 1701 and the memory 1702 are interconnected through a line. The memory 1702 stores program instructions and data.

The memory 1702 stores program instructions and data corresponding to the steps in FIG. 6 to FIG. 12A and FIG. 12B.

The processor 1701 is configured to perform the method steps performed by the second device that are shown in any one of the foregoing embodiments in FIG. 6 to FIG. 12A and FIG. 12B.

The transceiver 1703 is configured to receive or send data.

Optionally, the second device shown in FIG. 17 may be a chip.

Figure 18:
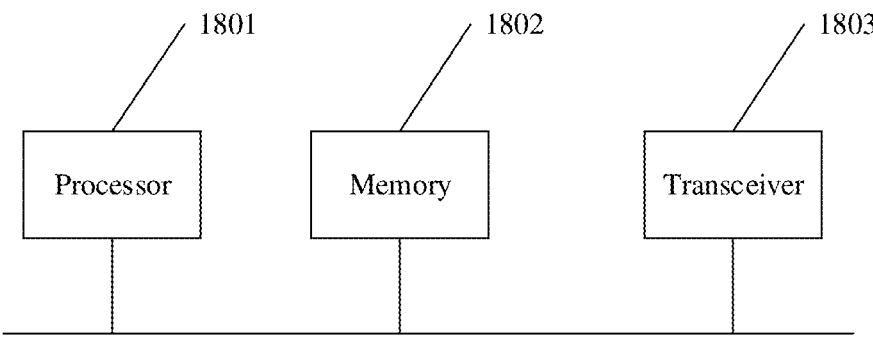
FIG. 18 is a schematic diagram of a structure of another example access control node according to an embodiment of this disclosure.

FIG. 18 is a schematic diagram of a structure of another example access control node according to an embodiment of this disclosure. Details are as follows.

The access control node may include a processor 1801 and a memory 1802. The processor 1801 and the memory 1802 are interconnected through a line. The memory 1802 stores program instructions and data.

The memory 1802 stores program instructions and data corresponding to the steps in FIG. 6 to FIG. 12A and FIG. 12B.

The processor 1801 is configured to perform the method steps performed by the access control node that are shown in any one of the foregoing embodiments in FIG. 6 to FIG. 12A and FIG. 12B.

The transceiver 1803 is configured to receive or send data.

Optionally, the access control node shown in FIG. 18 may be a chip.

Figure 19:
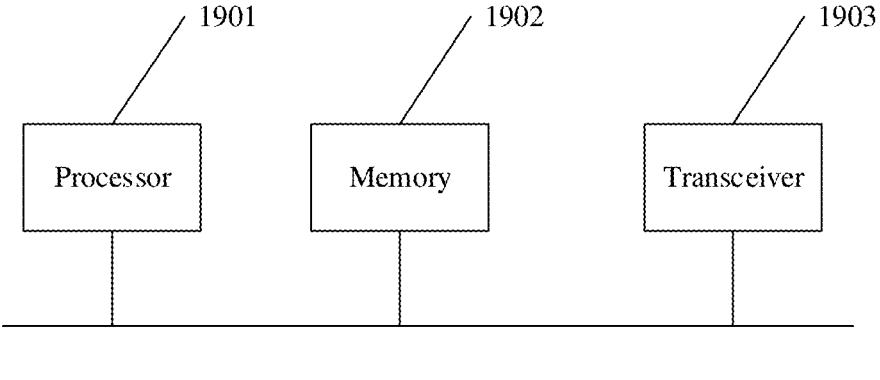
FIG. 19 is a schematic diagram of a structure of another example blockchain node according to an embodiment of this disclosure.

FIG. 19 is a schematic diagram of a structure of another blockchain node according to this disclosure. Details are as follows.

The blockchain node may include a processor 1901 and a memory 1902. The processor 1901 and the memory 1902 are interconnected through a line. The memory 1902 stores program instructions and data.

The memory 1902 stores program instructions and data corresponding to the steps in FIG. 6 to FIG. 12A and FIG. 12B.

The processor 1901 is configured to perform the method steps performed by the blockchain node that are shown in any one of the foregoing embodiments in FIG. 6 to FIG. 12A and FIG. 12B.

The transceiver 1903 is configured to receive or send data.

Optionally, the blockchain node shown in FIG. 19 may be a chip.

Figure 20:
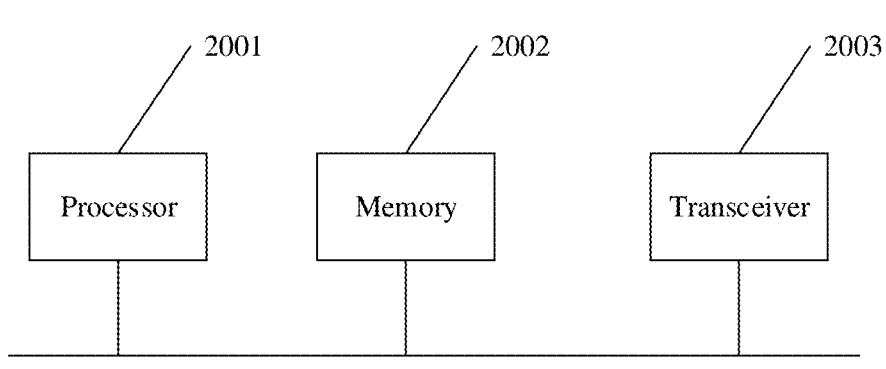
FIG. 20 is a schematic diagram of a structure of another example database node according to an embodiment of this disclosure.

FIG. 20 is a schematic diagram of a structure of another example database node according to an embodiment of this disclosure. Details are as follows.

The database node may include a processor 2001 and a memory 2002. The processor 2001 and the memory 2002 are interconnected through a line. The memory 2002 stores program instructions and data.

The memory 2002 stores program instructions and data corresponding to the steps in FIG. 6 to FIG. 12A and FIG. 12B.

The processor 2001 is configured to perform the method steps performed by the database node that are shown in any one of the foregoing embodiments in FIG. 6 to FIG. 12A and FIG. 12B.

The transceiver 2003 is configured to receive or send data.

Optionally, the database node shown in FIG. 20 may be a chip.

An embodiment of this disclosure further provides a computer-readable storage medium. The computer-readable storage medium stores a program. When the program is run on a computer, the computer is enabled to perform the steps in the methods described in the embodiments shown in FIG. 6 to FIG. 12A and FIG. 12B.

An embodiment of this disclosure further provides a device management apparatus. The device management apparatus may also be referred to as a digital processing chip or a chip. The chip includes a processing unit and a communication interface. The processing unit may obtain program instructions through the communication interface. When the program instructions are executed by the processing unit, the processing unit is configured to perform the method steps shown in any one of the foregoing embodiments in FIG. 6 to FIG. 12A and FIG. 12B.

An embodiment of this disclosure further provides a digital processing chip. A circuit and one or more interfaces that are configured to implement functions of the processor or the processor are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communication interface. The digital processing chip implements, according to program code stored in an external memory, the method steps shown in any one of the embodiments in FIG. 6 to FIG. 12A and FIG. 12B.

An embodiment of this disclosure further provides a computer program product. When the computer program product runs on a computer, the computer is enabled to perform the steps in the methods described in the embodiments shown in FIG. 6 to FIG. 12A and FIG. 12B.

The device management apparatus provided in this embodiment may be a chip. The chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that the chip in a server performs the method described in embodiments shown in FIG. 6 to FIG. 12A and FIG. 12B. Optionally, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

The processing unit or the processor may be a central processing unit (CPU), a network processor (NPU), a graphics processing unit (GPU), a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor, or may be any conventional processor or the like.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this disclosure, connection relationships between modules indicate that the modules have communication connections with each other, which may be specifically implemented as one or more communication buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this disclosure, software program implementation is a better implementation in most cases. Based on such an understanding, the technical solutions of this disclosure essentially or the part contributing to the conventional technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, or a network device) to perform the methods described in embodiments of this disclosure.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some procedures or functions in embodiments of this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid-state disk (SSD)), or the like.

In the specification, claims, and accompanying drawings of this disclosure, the terms "first", "second", "third", "fourth", and so on (if existent) are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Finally, it should be noted that the foregoing descriptions are merely non-limiting examples of specific implementations of this disclosure, and are not intended to limit the protection scope, which is intended to cover any variation or replacement readily determined by a person of ordinary skill in the art.

What is claimed is:

1. A device management system, comprising a first device comprising at least one processor and communication circuitry including a transceiver, a second device, a first access control node, a file system, a database node, and a blockchain node, wherein a database for storing data is deployed on the database node;

the second device comprises a processor and a memory storing program instructions that when executed by the processor, cause the second device to send an identity file to the first access control node, and the identity file comprises identity information of the first device and a public key of the second device;

the first access control node comprises a memory, a processor and a transceiver and is configured to request association information of the first device from the database node based on the identity file, the association information comprises a public key of a device associated with the first device, and the association information is obtained by the database node from the blockchain node;

when the first access control node determines, based on the association information, that the first device is associated with the second device, the first access control node is further configured to send the identity file to the file system; and the file system is configured to store the identity file and feed back a first identifier corresponding to the identity file to the first access control node, and the first identifier is used to read the identity file from the file system.

2. The system according to claim 1, wherein the program instructions in the memory of the second device, when executed by the processor of the second device, further cause the second device to: before the sending of the identity file to the first access control node, send registration information to the blockchain node, and the registration information comprises information about the first device and the public key of the second device;

the blockchain node is configured to write the information about the first device and the public key of the second device into transaction information in a blockchain for the second device according to a smart contract corresponding to the first device, for registration; and the database node is configured to: obtain transaction information of the blockchain node, and store, in the association information, a public key of the first device and the public key of the second device that are comprised in the transaction information.

3. The system according to claim 2, wherein the program instructions in the memory of the second device, when executed by the processor of the second device, further cause the second device to send the first identifier to the blockchain node; and the blockchain node is further configured to update the first identifier to locally stored transaction information of the first device according to the smart contract corresponding to the first device.

4. The system according to claim 1, wherein the program instructions in the memory of the second device, when executed by the processor of the second device, further cause the second device to send an identity request message to the first access control node, and the identity request message carries the information about the first device and the public key of the second device, and the identity request message is used to request the identity file;

the first access control node is further configured to obtain the first identifier;

the first access control node is further configured to: send the first identifier to the file system, and receive the identity file fed back by the file system; and when a public key comprised in the identity file matches the public key of the second device, the first access control node is further configured to send the identity file to the second device.

5. The system according to claim 1, wherein the transceiver of the first device is further configured to send an identity credential to the first access control node, and the identity credential comprises an identifier of the first device, to request the identity file from the first access control node;

the first access control node is further configured to: when verification is performed on the identity credential and succeeds, send a second request message to the database node, wherein the second request message comprises the identifier of the first device;

the database node is further configured to feed back the first identifier to the first access control node;

the first access control node is further configured to: send the first identifier to the file system, and receive the identity file fed back by the file system; and when an identifier comprised in the identity file matches the identifier in the identity credential, the first access control node is further configured to send the identity file to the first device.

6. The system according to claim 5, wherein the device management system further comprises a registration server;

the first device sends the identity credential to the registration server through an encrypted channel;

the registration server is configured to forward the identity credential to an access control server through an encrypted channel;

the first access control node is further configured to send the identity file to the registration server; and the registration server is further configured to forward the identity file to the first device.

7. The system according to claim 5, wherein the device management system further comprises a second access control node;

the transceiver of the first device is further configured to send a third request message to the second access control node;

the second access control node is configured to obtain a second identifier of the identity file after verification is performed on the third request message and succeeds;

the second access control node is further configured to feed back the second identifier to the first device; and the at least one processor of the first device is further configured to: when it is verified that the first identifier matches the second identifier, store the identity file.

8. The system according to claim 2, wherein the device management system further comprises a third device;

the program instructions in the memory of the second device, when executed by the processor of the second device, further cause the second device to:

add information about the third device to the identity file, to obtain an updated identity file, wherein the information about the third device comprises a public key of the third device, and the updated identity file indicates that the first device is associated with the third device; and send the updated identity file to the first access control node;

the first access control node is further configured to: send the updated identity file to the file system, and receive a third identifier fed back by the file system;

the first access control node is further configured to send the third identifier to the second device;

the program instructions in the memory of the second device, when executed by the processor of the second device, further cause the second device to:

send the third identifier to the third device, wherein the third identifier is used to request the updated identity file from the file system; and send update information to the blockchain node, wherein the update information comprises the public key of the first device, the public key of the third device, and the third identifier;

the blockchain node updates the transaction information based on the update information, to obtain updated transaction information; and the database node is further configured to: obtain the updated transaction information, and update the association information based on the updated transaction information, to obtain updated association information.

9. A device management method, comprising:

receiving, by a first access control node, an identity file sent by a second device, wherein the identity file comprises identity information of a first device and a public key of the second device;

requesting, by the first access control node, association information of the first device from a database node based on the identity file, wherein the association information comprises a public key of a device associated with the first device, and the association information is obtained by the database node from a blockchain node;

when the first access control node determines, based on ownership information, that the first device is associated with the second device, sending, by the first access control node, the identity file to a file system, to indicate to the file system to store the identity file; and receiving, by the first access control node, a first identifier fed back by the file system, and sending the first identifier to the second device, wherein the first identifier is used to read the identity file from the file system.

10. The method according to claim 9, wherein the requesting of the association information of the first device from the database node based on the identity file comprises:

when the first access control node determines, based on a signature carried in the identity file, that the identity file is complete, requesting the association information of the first device from the database node based on the identity file.

11. The method according to claim 9, further comprising:

receiving, by the first access control node, an identity request message sent by the second device, wherein the identity request message carries information about the first device and the public key of the second device, and the identity request message is used to request the identity file;

sending, by the first access control node, a first request message to the database node, wherein the first request message comprises the information about the first device;

receiving, by the first access control node, the first identifier sent by the database node;

sending, by the first access control node, the first identifier to the file system, and receiving the identity file fed back by the file system; and when a public key comprised in the identity file matches the public key of the second device, sending, by the first access control node, the identity file to the second device.

12. The method according to claim 9, further comprising:

receiving, by the first access control node, an identity credential sent by the first device, wherein the identity credential comprises an identifier of the first device;

performing, by the first access control node, verification on the identity credential;

when verification on the identity credential succeeds, sending, by the first access control node, a second request message to the database node, wherein the second request message comprises the identifier of the first device;

receiving, by the first access control node, the first identifier sent by the database node;

sending, by the first access control node, the first identifier to the file system, and receiving the identity file fed back by the file system; and when an identifier comprised in the identity file matches the identifier of the first device, sending, by the first access control node, the identity file to the first device.

13. The method according to claim 12, wherein the receiving of the identity credential sent by the first device comprises:

receiving, by the first access control node, the identity credential forwarded by a registration server, wherein the identity credential is sent by the first device to the registration server through an encrypted channel between the first device and the registration server; and the sending of the identity file to the first device comprises:

sending, by the first access control node, the identity file to the first device by using the registration server.

14. The method according to claim 9, further comprising:

receiving, by the first access control node, an updated identity file sent by the second device;

sending, by the first access control node, the updated identity file to the file system, and receiving a third identifier fed back by the file system; and sending, by the first access control node, the third identifier to the second device, wherein the third identifier is used to request the updated identity file.

15. An access control node, comprising a processor, wherein the processor is coupled to a memory, the memory stores program instructions that, when executed by the processor, enable the access control node to implement operations comprising:

receiving an identity file sent by a second device, wherein the identity file comprises identity information of a first device and a public key of the second device;

requesting association information of the first device from a database node based on the identity file, wherein the association information comprises a public key of a device associated with the first device, and the association information is obtained by the database node from a blockchain node;

upon determining, based on ownership information, that the first device is associated with the second device, sending the identity file to a file system, to indicate to the file system to store the identity file; and receiving a first identifier fed back by the file system, and sending the first identifier to the second device, wherein the first identifier is used to read the identity file from the file system.

16. The access control node according to claim 15, wherein the requesting of the association information of the first device from the database node based on the identity file comprises:

upon determining, based on a signature carried in the identity file, that the identity file is complete, requesting the association information of the first device from the database node based on the identity file.

17. The access control node according to claim 15, wherein the operations further comprise:

receiving an identity request message sent by the second device, wherein the identity request message carries information about the first device and the public key of the second device, and the identity request message is used to request the identity file;

sending a first request message to the database node, wherein the first request message comprises the information about the first device;

receiving the first identifier sent by the database node;

sending the first identifier to the file system, and receiving the identity file fed back by the file system; and when a public key comprised in the identity file matches the public key of the second device, sending the identity file to the second device.

18. The access control node according to claim 15, wherein the operations further comprise:

receiving an identity credential sent by the first device, wherein the identity credential comprises an identifier of the first device;

performing verification on the identity credential;

when verification on the identity credential succeeds, sending a second request message to the database node, wherein the second request message comprises the identifier of the first device;

receiving the first identifier sent by the database node;

sending the first identifier to the file system, and receiving the identity file fed back by the file system; and when an identifier comprised in the identity file matches the identifier of the first device, sending the identity file to the first device.

19. The access control node according to claim 18, wherein the receiving of the identity credential sent by the first device comprises:

receiving the identity credential forwarded by a registration server, wherein the identity credential is sent by the first device to the registration server through an encrypted channel between the first device and the registration server; and the sending of the identity file to the first device comprises:

sending the identity file to the first device by using the registration server.

20. The access control node according to claim 15, wherein the operations further comprise:

receiving an updated identity file sent by the second device;

sending the updated identity file to the file system, and receiving a third identifier fed back by the file system; and sending the third identifier to the second device, wherein the third identifier is used to request the updated identity file.

\* \* \* \* \*